(12) United States Patent
Zhang et al.

(10) Patent No.: US 10,560,929 B2
(45) Date of Patent: Feb. 11, 2020

(54) RESOURCE REQUEST METHOD AND SYSTEM, DEVICE, AND NETWORK SIDE NODE

(71) Applicant: HUAWEI TECHNOLOGIES CO., LTD., Shenzhen, Guangdong (CN)

(72) Inventors: Chi Zhang, Shanghai (CN); Guohua Zhou, Shanghai (CN); Dongdong Wei, Shanghai (CN); Yi Wang, Shanghai (CN)

(73) Assignee: HUAWEI TECHNOLOGIES CO., LTD, Shenzhen, Guangdong (CN)

( * ) Notice: Subject to any disclaimer, the term of this patent is extended or adjusted under 35 U.S.C. 154(b) by 0 days.

(21) Appl. No.: 16/021,293

(22) Filed: Jun. 28, 2018

(65) Prior Publication Data
US 2018/0317210 A1    Nov. 1, 2018

Related U.S. Application Data

(63) Continuation of application No. PCT/CN2015/099606, filed on Dec. 29, 2015.

(51) Int. Cl.
*H04W 72/04* (2009.01)
*H04W 88/04* (2009.01)
(Continued)

(52) U.S. Cl.
CPC ......... *H04W 72/042* (2013.01); *H04L 5/0053* (2013.01); *H04W 28/0278* (2013.01);
(Continued)

(58) Field of Classification Search
CPC . H04W 72/02; H04W 88/04; H04W 28/0278; H04B 7/15542; Y02D 70/21
See application file for complete search history.

(56) References Cited

U.S. PATENT DOCUMENTS 10,028,260 B1 * 7/2018 Pawar ................... H04W 40/22
10,306,568 B2 * 5/2019 Kim ....................... H04W 72/04
2016/0295565 A1   10/2016 Kim et al.

FOREIGN PATENT DOCUMENTS

| CN | 104954976 A | 9/2015 |
| WO | 2015069051 A1 | 5/2015 |
| WO | 2017000373 A1 | 1/2017 |

OTHER PUBLICATIONS

International Search Report dated Oct. 10, 2016 in corresponding International Patent Application No. PCT/CN2015/099606.
(Continued)

*Primary Examiner* — Ayaz R Sheikh
*Assistant Examiner* — Debebe A Asefa
(74) *Attorney, Agent, or Firm* — Womble Bond Dickinson (US) LLP

(57) ABSTRACT

A resource request method and system, a device, and a network side node are provided. The method includes the following steps: A target device sends a first target device message to a relay device. When receiving the first target device message, the relay device sends a first relay device message to a network side node according to the first target device message. The network side node receives the first relay device message, and sends first grant information to the target device according to the first relay device message. The first grant information includes a data transmission resource allocated by the network side node to the target device. According to embodiments of the present disclosure, energy consumption of a sending device, that is, a target device, can be reduced while the sending device obtains a transmission resource.

12 Claims, 7 Drawing Sheets

(51) Int. Cl.
    *H04W 76/14*     (2018.01)
    *H04L 5/00*     (2006.01)
    *H04W 28/02*     (2009.01)
    *H04W 52/02*     (2009.01)

(52) U.S. Cl.
    CPC ........... *H04W 76/14* (2018.02); *H04W 88/04* (2013.01); *H04W 52/0209* (2013.01)

(56) References Cited

OTHER PUBLICATIONS

International Search Report, dated Oct. 10, 2016, in International Application No. PCT/CN2015/099606 (4 pp.).
XP051004828, R2-154269, Coolpad, "Further Discussion on Resource Allocation Issues and Way Forward for Release 13," 3GPP TSG-RAN WG2 #91bis, Malmö, Sweden, Oct. 5-10, 2015, pp. 1-4.
Extended European Search Report, dated Oct. 11, 2018, in European Application No. 15911759.7 (8 pp.).

* cited by examiner

RESOURCE REQUEST METHOD AND SYSTEM, DEVICE, AND NETWORK SIDE NODE

CROSS-REFERENCE TO RELATED APPLICATIONS

This disclosure is a continuation of International Application No. PCT/CN2015/099606, filed on Dec. 29, 2015, the disclosure of which is hereby incorporated by reference in its entirety.

TECHNICAL FIELD

The present disclosure relates to the field of communications technologies, and in particular, to a resource request method and system, a device, and a network side node.

BACKGROUND

With popularity of intelligent terminals, a quantity of intelligent terminals in a network is explosively increasing. To better meet a user requirement and improve information exchange efficiency, device-to-device (D2D) communication emerges as the times require. A D2D communications technology is a technology that implements direct communication between user equipments close to each other, without using a third party. The technology can improve spectrum utilization, relieve burden of a cellular network, increase a bit rate, and so on; and can support a new small-range point-to-point data service. Therefore, D2D communication plays an extremely important role in future evolution of communications networks.

In a co-site-coverage D2D communication process, after obtaining a data transmission resource from a base station, a device A may directly transmit data to a device B in coverage of the same base station. When the device A has no data transmission resource, the device A may need to request the base station to allocate a data transmission resource to the device A. If an available quantity of electricity of the device A is excessively low or the device A is a device sensitive to energy consumption, energy consumption of the device A is further accelerated in the existing manner in which the device A directly requests the data transmission resource from the base station.

SUMMARY

Embodiments of the present disclosure provide a resource request method and system, a device, and a network side node, so as to reduce energy consumption of a sending device while the sending device obtains a transmission resource.

A first aspect of the embodiments of the present disclosure provides a resource request method, including:

receiving, by a relay device, a first target device message sent by a target device, where the first target device message is used to trigger the relay device to request a network side node to allocate a data transmission resource to the target device; and sending, by the relay device, a first relay device message to the network side node according to the first target device message, where the first relay device message is used to trigger the network side node to send first grant information to the target device, and the first grant information includes the data transmission resource allocated by the network side node to the target device; where the data transmission resource is used by the target device to transmit to-be-transmitted data.

In the first aspect of the embodiments of the present disclosure, the relay device applies, in place of the target device, to the network side node for the data transmission resource used by the target device to transmit the to-be-transmitted data, and the target device may not need to directly apply to the network side node for the data transmission resource. Therefore, the target device can obtain the data transmission resource, and transmit energy consumption of the target device can be reduced.

Based on the first aspect of the embodiments of the present disclosure, in a first possible implementation of the first aspect of the embodiments of the present disclosure, if the network side node preconfigures, for the target device, a resource used to send the first target device message to the relay device, that is, a D2D sidelink buffer status report resource, the relay device directly receives the first target device message that is sent by the target device by using the D2D sidelink buffer status report resource, without requesting the network side node to configure the D2D sidelink buffer status report resource for the target device, so as to reduce processing steps of the relay device.

With reference to the first possible implementation of the first aspect of the embodiments of the present disclosure, in a second possible implementation of the embodiments of the present disclosure, the relay device detects whether data exists on the D2D sidelink buffer status report resource, and when detecting that the data exists on the D2D sidelink buffer status report resource, determines that a message received by the relay device is the first target device message rather than another message sent by the target device, so as to trigger the relay device to send the first relay device message to the network side node.

With reference to the first possible implementation of the first aspect of the embodiments of the present disclosure, in a third possible implementation of the embodiments of the present disclosure, the relay device detects whether a first preset logical channel identifier exists in a D2D logical channel identifier, and when detecting that the first preset logical channel identifier exists, determines that a message received by the relay device is the first target device message rather than another message sent by the target device, so as to trigger the relay device to send the first relay device message to the network side node.

The first preset logical channel identifier is an identifier specified for the first target device message on a D2D sidelink shared channel in a D2D communications standard protocol.

Based on the first aspect of the embodiments of the present disclosure, in a fourth possible implementation of the first aspect of the embodiments of the present disclosure, if the network side node does not preconfigure, for the target device, a resource used to send the first target device message to the relay device, that is, a D2D sidelink buffer status report resource, before receiving the first target device message, the relay device performs the following steps:

receiving a second target device message sent by the target device, where the second target device message is used to trigger the relay device to request the network side node to configure the D2D sidelink buffer status report resource for the target device; and sending a second relay device message to the network side node according to the second target device message, where the second relay device message is used to trigger the network side node to send second grant information to the target device, and the second grant information includes the D2D sidelink buffer status report resource configured by the network side node for the target device; where the D2D sidelink buffer status report resource is used by the target device to send the first target device message to the relay device.

In the fourth possible implementation of the first aspect of the embodiments of the present disclosure, the relay device applies, in place of the target device, to the network side node for the D2D sidelink buffer status report resource, so that the target device can send the first target device message to the relay device by using the D2D sidelink buffer status report resource.

With reference to the fourth possible implementation of the first aspect of the embodiments of the present disclosure, in a fifth possible implementation of the embodiments of the present disclosure, the relay device detects whether data exists on a D2D sidelink request message resource, and when detecting that the data exists on the D2D sidelink request message resource, determines that a message received by the relay device is the second target device message rather than another message sent by the target device, so as to trigger the relay device to send the second relay device message to the network side node.

With reference to the first to the fifth possible implementations of the first aspect of the embodiments of the present disclosure, in a sixth possible implementation of the first aspect of the embodiments of the present disclosure, if the network side node preconfigures, for the relay device, a resource used to send the first relay device message to the network side node, that is, an extended-buffer-status-report resource, the relay device directly sends the first relay device message to the network side node by using the extended-buffer-status-report resource, without applying to the network side node for the extended-buffer-status-report resource, so as to reduce process steps of the relay device.

With reference to the first to the fifth possible implementations of the first aspect of the embodiments of the present disclosure, in a seventh possible implementation of the first aspect of the embodiments of the present disclosure, if the network side node does not preconfigure, for the relay device, a resource used to send the first relay device message to the network side node, that is, an extended-buffer-status-report resource, before sending the first relay device message, the relay device performs the following steps:

sending, by the relay device, a third relay device message to the network side node, where the third relay device message is used to request the network side node to configure the extended-buffer-status-report resource for the relay device; and receiving, by the relay device, third grant information sent by the network side node, where the third grant information includes the extended-buffer-status-report resource configured by the network side node for the relay device.

In the seventh possible implementation of the first aspect of the embodiments of the present disclosure, the relay device applies to the network side node for the extended-buffer-status-report resource, so that the relay device can send the first relay device message to the network side node by using the extended-buffer-status-report resource.

With reference to the seventh possible implementation of the first aspect of the embodiments of the present disclosure, in an eighth possible implementation of the first aspect of the embodiments of the present disclosure, the relay device sends the first relay device message to the network side node according to the first target device message by using the extended-buffer-status-report resource.

With reference to the first to the eighth possible implementations of the first aspect of the embodiments of the present disclosure, in a ninth possible implementation of the first aspect of the embodiments of the present disclosure, the first relay device message is further used to trigger the network side node to send fourth grant information to the relay device; and after sending the first relay device message to the network side node according to the first target device message, the relay device performs the following step:

receiving, by the relay device, the fourth grant information sent by the network side node, where the fourth grant information includes a data forwarding resource allocated by the network side node to the relay device, and the data forwarding resource is used by the relay device to forward the to-be-transmitted data, so that the relay device forwards the to-be-transmitted data to the network side node by using the data forwarding resource.

A second aspect of the embodiments of the present disclosure provides another resource request method, including:

sending, by a target device, a first target device message to a relay device, where the first target device message is used to trigger the relay device to request a network side node to allocate a data transmission resource to the target device; and receiving, by the target device, first grant information sent by the network side node, where the first grant information includes the data transmission resource allocated by the network side node to the target device; where the data transmission resource is used by the target device to transmit to-be-transmitted data.

In the second aspect of the embodiments of the present disclosure, the target device requests the relay device to apply, for the target device, to the network side node for the data transmission resource used to transmit the to-be-transmitted data, so that transmit energy consumption of the target device is reduced in comparison with a case in which the target device directly applies to the network side node for the data transmission resource.

Based on the second aspect of the embodiments of the present disclosure, in a first possible implementation of the second aspect of the embodiments of the present disclosure, if the network side node preconfigures, for the target device, a resource used to send the first target device message to the relay device, that is, a D2D sidelink buffer status report resource, the target device directly sends the first target device message to the relay device by using the D2D sidelink buffer status report resource, without requesting the relay device to apply, for the target device, to the network side node for the D2D sidelink buffer status report resource, so as to reduce processing steps of the relay device.

Based on the second aspect of the embodiments of the present disclosure, in a second possible implementation of the second aspect of the embodiments of the present disclosure, if the network side node does not preconfigure, for the target device, a resource used to send the first target device message to the relay device, that is, a D2D sidelink buffer status report resource, before sending the first target device message to the relay device, the target device performs the following steps:

sending a second target device message to the relay device, where the second target device message is used to trigger the relay device to request the network side node to configure the D2D sidelink buffer status report resource for the target device; and receiving second grant information sent by the network side node, where the second grant information includes the D2D sidelink buffer status report resource configured by the network side node for the target device.

In the second possible implementation of the second aspect of the embodiments of the present disclosure, the target device requests the relay device to apply, in place of the target device, to the network side node for the D2D sidelink buffer status report resource, so that the target device can send the first target device message to the relay device by using the D2D sidelink buffer status report resource.

With reference to the first or the second possible implementation of the second aspect of the embodiments of the present disclosure, in a third possible implementation of the second aspect of the embodiments of the present disclosure, the target device sends the first target device message to the relay device by using the D2D sidelink buffer status report resource.

A third aspect of the embodiments of the present disclosure provides another resource request method, including:

receiving, by a network side node, a first relay device message sent by a relay device, where the first relay device message is used to trigger the network side node to send first grant information to a target device; and sending, by the network side node, the first grant information to the target device according to the first relay device message, where the first grant information includes a data transmission resource allocated by the network side node to the target device; where the data transmission resource is used by the target device to transmit to-be-transmitted data.

In the third aspect of the embodiments of the present disclosure, the network side node allocates the data transmission resource to the target device according to the first relay device message sent by the relay device rather than a message sent by the target device, so as to reduce transmit energy consumption of the target device while ensuring that the target device obtains the data transmission resource.

Based on the third aspect of the embodiments of the present disclosure, in a first possible implementation of the third aspect of the embodiments of the present disclosure, if the network side node does not preconfigure, for the target device, a resource used by the target device to send a first target device message to the relay device, that is, a D2D sidelink buffer status report resource, before receiving the first relay device message sent by the relay device, the network side node further performs the following steps:

receiving a second relay device message sent by the relay device, where the second relay device message is used to trigger the network side node to send second grant information to the target device; and sending the second grant information to the target device according to the extended request message, where the second grant information includes the D2D sidelink buffer status report resource configured by the network side node for the target device; where the D2D sidelink buffer status report resource is used by the target device to send the first target device message to the relay device.

In the first possible implementation of the third aspect of the embodiments of the present disclosure, the network side node configures the D2D sidelink buffer status report resource for the target device according to the second relay device message sent by the relay device, so that the target device sends the first target device message to the network side node.

With reference to the first possible implementation of the third aspect of the embodiments of the present disclosure, in a second possible implementation of the third aspect of the embodiments of the present disclosure, the network side node detects whether data exists on an extended-request-message resource, and when detecting that the data exists on the extended-request-message resource, determines that a message received by the network side node is the second relay device message rather than another message sent by the relay device, so as to trigger the network side node to send the second grant information to the target device.

With reference to the first or the second possible implementation of the third aspect of the embodiments of the present disclosure, in a third possible implementation of the third aspect of the embodiments of the present disclosure, if the network side node preconfigures, for the relay device, a resource used to send the first relay device message to the network side node, that is, an extended-buffer-status-report resource, the network side node directly receives the first relay device message sent by the relay device, so as to trigger the network side node to allocate the data transmission resource to the target device according to the first relay device message.

With reference to the first to the third possible implementations of the third aspect of the embodiments of the present disclosure, in a fourth possible implementation of the third aspect of the embodiments of the present disclosure, the network side node detects whether data exists on the extended-buffer-status-report resource, and when detecting that the data exists on the extended-buffer-status-report resource, determines that a message received by the network side node is the first relay device message rather than another message sent by the relay device, so as to trigger the network side node to send the first grant information to the target device.

With reference to the first to the third possible implementations of the third aspect of the embodiments of the present disclosure, in a fifth possible implementation of the third aspect of the embodiments of the present disclosure, the network side node detects whether a second preset logical channel identifier exists in a logical channel identifier, and when detecting that the second preset logical channel identifier exists, determines that a message received by the network side node is the first relay device message rather than another message sent by the relay device, so as to trigger the network side node to send the first grant information to the target device.

The second preset logical channel identifier is an identifier specified for the extended buffer status report on an uplink shared channel in a D2D communications standard protocol.

With reference to the first to the fifth possible implementations of the third aspect of the embodiments of the present disclosure, in a sixth possible implementation of the third aspect of the embodiments of the present disclosure, if the network side node does not preconfigure, for the relay device, a resource used to send the first relay device message to the network side node, that is, an extended-buffer-status-report resource, before receiving the first relay device message sent by the relay device, the network side node further performs the following steps:

receiving a third relay device message sent by the relay device, where the third relay device message is used to request the network side node to configure the extended-buffer-status-report resource for the relay device; and sending third grant information to the relay device according to the third relay device message, where the third grant information includes the extended-buffer-status-report resource configured by the network side node for the relay device, where the extended-buffer-status-report resource is used by the relay device to send the first relay device message to the network side node.

In the sixth possible implementation of the third aspect of the embodiments of the present disclosure, the network side node configures the extended-buffer-status-report resource for the relay device according to the third relay device message sent by the relay device, so that the relay device sends the first relay device message to the network side node.

With reference to the first to the sixth possible implementations of the third aspect of the embodiments of the present disclosure, in a seventh possible implementation of the third aspect of the embodiments of the present disclosure, the first relay device message is further used to trigger the network side node to send fourth grant information to the relay device; and before, when, or after sending the first grant information to the target device according to the first relay device message, the network side node further performs the following step:

sending, by the network side node, the fourth grant information to the relay device according to the first relay device message, where the fourth grant information includes a data forwarding resource allocated by the network side node to the relay device, and the data forwarding resource is used by the relay device to forward the to-be-transmitted data, so that the relay device forwards the to-be-transmitted data to the network side node by using the data forwarding resource.

A fourth aspect of the embodiments of the present disclosure provides a relay device, including:

a message receiving unit, configured to receive a first target device message sent by a target device, where the first target device message is used to trigger the relay device to request a network side node to allocate a data transmission resource to the target device; and a message sending unit, configured to send a first relay device message to the network side node according to the first target device message, where the first relay device message is used to trigger the network side node to send first grant information to the target device, and the first grant information includes the data transmission resource allocated by the network side node to the target device; where the data transmission resource is used by the target device to transmit to-be-transmitted data.

The relay device provided in the fourth aspect of the embodiments of the present disclosure is configured to implement the resource request method provided in the first aspect of the embodiments of the present disclosure. Details are not described herein again.

A fifth aspect of the embodiments of the present disclosure provides a target device, including:

a message sending unit, configured to send a first target device message to a relay device, where the first target device message is used to trigger the relay device to request a network side node to allocate a data transmission resource to the target device; and a grant information receiving unit, configured to receive first grant information sent by the network side node, where the first grant information includes the data transmission resource allocated by the network side node to the target device; where the data transmission resource is used by the target device to transmit to-be-transmitted data.

The target device provided in the fifth aspect of the embodiments of the present disclosure is configured to implement the resource request method provided in the second aspect of the embodiments of the present disclosure. Details are not described herein again.

A sixth aspect of the embodiments of the present disclosure provides a network side node, including:

a report receiving unit, configured to receive a first relay device message sent by a relay device, where the first relay device message is used to trigger the network side node to send first grant information to a target device; and a grant information sending unit, configured to send the first grant information to the target device according to the first relay device message, where the first grant information includes a data transmission resource allocated by the network side node to the target device; where the data transmission resource is used by the target device to transmit to-be-transmitted data.

The network side node provided in the sixth aspect of the embodiments of the present disclosure is configured to implement the resource request method provided in the third aspect of the embodiments of the present disclosure. Details are not described herein again.

A seventh aspect of the embodiments of the present disclosure provides a resource request system, including the relay device in the fourth aspect, the target device in the fifth aspect, and the network side node in the sixth aspect, where the relay device and the target device are in network coverage of the network side node, the target device is a device having a limited quantity of electricity, and the relay device is a device having an unlimited quantity of electricity.

In the embodiments of the present disclosure, the target device sends the first target device message to the relay device. When receiving the first target device message, the relay device sends the first relay device message to the network side node according to the first target device message. The network side node receives the first relay device message, and sends the first grant information to the target device according to the first relay device message. The first grant information includes the data transmission resource allocated by the network side node to the target device. Therefore, the relay device requests, in place of the target device, the data transmission resource from the network side node, and the target device may not need to directly request the data transmission resource from the network side node, so as to reduce transmit energy consumption of the target device, and ensure that the target device obtains the transmission resource.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a resource request method and system, a device, and a network side node that may be applied to a scenario in which a sending device in co-site-coverage D2D communication requests a relay device to request, in place of the sending device, a resource from a network side, and receives the resource allocated by the network side. The co-site-coverage means that the relay device and the sending device are in network coverage of the same network side. The resource request method and system, the device, and the network side node that are provided in the embodiments of the present disclosure may be applied to co-site-coverage D2D communication in a Long Term Evolution (LTE) system, an LTE-A system, or a future possible mobile communications system. The embodiments of the present disclosure mainly describe in detail a scenario in which a sending device applied to co-site-coverage D2D communication in the LTE system requests a relay device to request, in place of the sending device, a resource from a network side, and receives the resource allocated by the network side.

Figure 1:
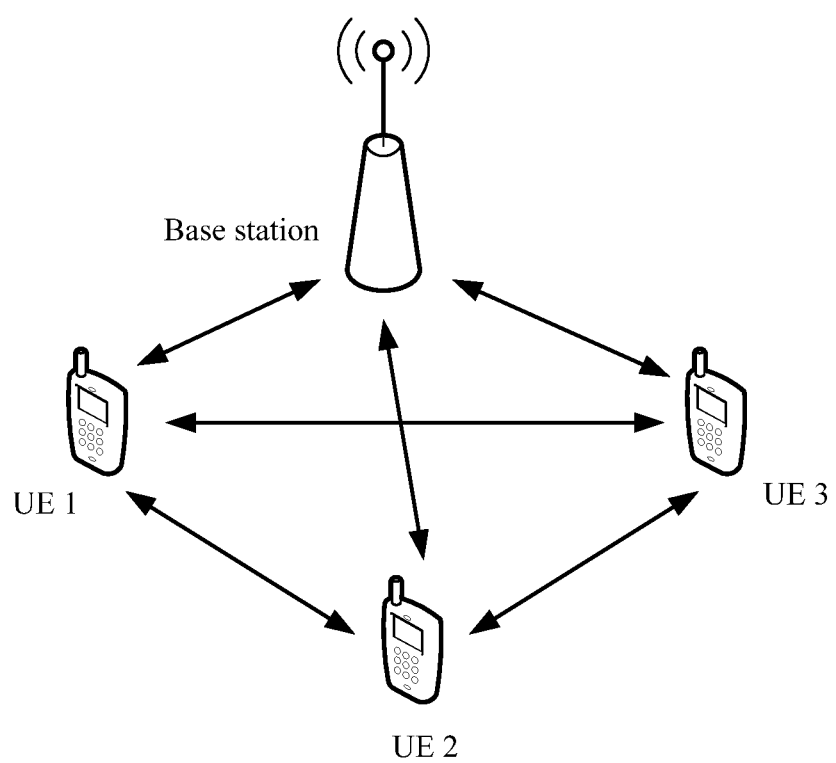
FIG. 1 is a network architecture diagram of D2D communication in an LTE system architecture.

As shown in FIG. 1, FIG. 1 is a network architecture diagram of co-site-coverage D2D communication in an LTE system architecture. A base station is an evolved Node B (eNB), and UE 1, UE 2, and UE 3 are a plurality of user equipments in network coverage of the eNB. It can be learned from FIG. 1 that, data may be transmitted between the user equipment and the eNB, and data may also be directly transmitted between user equipments. Usually, before transmitting data, user equipment may need to request the eNB to allocate a data transmission resource to the user equipment, so as to normally transmit the data. However, in a process in which the user equipment sends a request to the eNB, a quantity of electricity of the user equipment is consumed to a specific degree. If the user equipment is sensitive to energy consumption or has a limited quantity of electricity, consumption of the quantity of electricity of the user equipment is further accelerated in the manner in which the user equipment directly requests the data transmission resource from the eNB.

In the resource request method provided in the embodiments of the present disclosure, instead of directly requesting a data transmission resource from an eNB, user equipment that has a limited quantity of electricity or that is sensitive to energy consumption finds a relay device and requests the relay device to request, in place of the user equipment, the data transmission resource from the eNB; and receives the resource allocated by the eNB, so as to reduce transmit energy consumption of the user equipment.

A target device in the embodiments of the present disclosure is a sending device that may need a data transmission resource, and may include but is not limited to user equipment that has a limited quantity of electricity and a communication function, such as a wristband, a watch, and an intelligent wearable device. The target device may further include a mobile phone having a limited quantity of electricity, and a tablet computer (Pad) having a limited quantity of electricity. It can be understood that, the target device having a limited quantity of electricity may need to be frequently charged by a user of the target device. Otherwise, a remaining quantity of electricity of the target device affects normal communication of the user of the target device.

A relay device in the embodiments of the present disclosure is user equipment relatively close to the target device, and the relay device and the target device are in network coverage of a same eNB. The relay device may include but is not limited to user equipment that has a communication function, such as a mobile phone and a tablet computer. It can be understood that, the relay device is user equipment that has an unlimited quantity of electricity or that is insensitive to energy consumption, that is, the relay device has a relatively large remaining quantity of electricity. This not only can ensure normal communication of a user of the relay device, but also can assist another device in normal communication.

A network side node in the embodiments of the present disclosure is the eNB, and may further include a base station or a wireless local network access point (WLAN AP) in another system. Both the relay device and the target device are in network coverage of the network side node. The network side node allocates resources to or configures various resources for the relay device and the target device, so as to ensure normal communication of the relay device and the target device.

Figure 2:
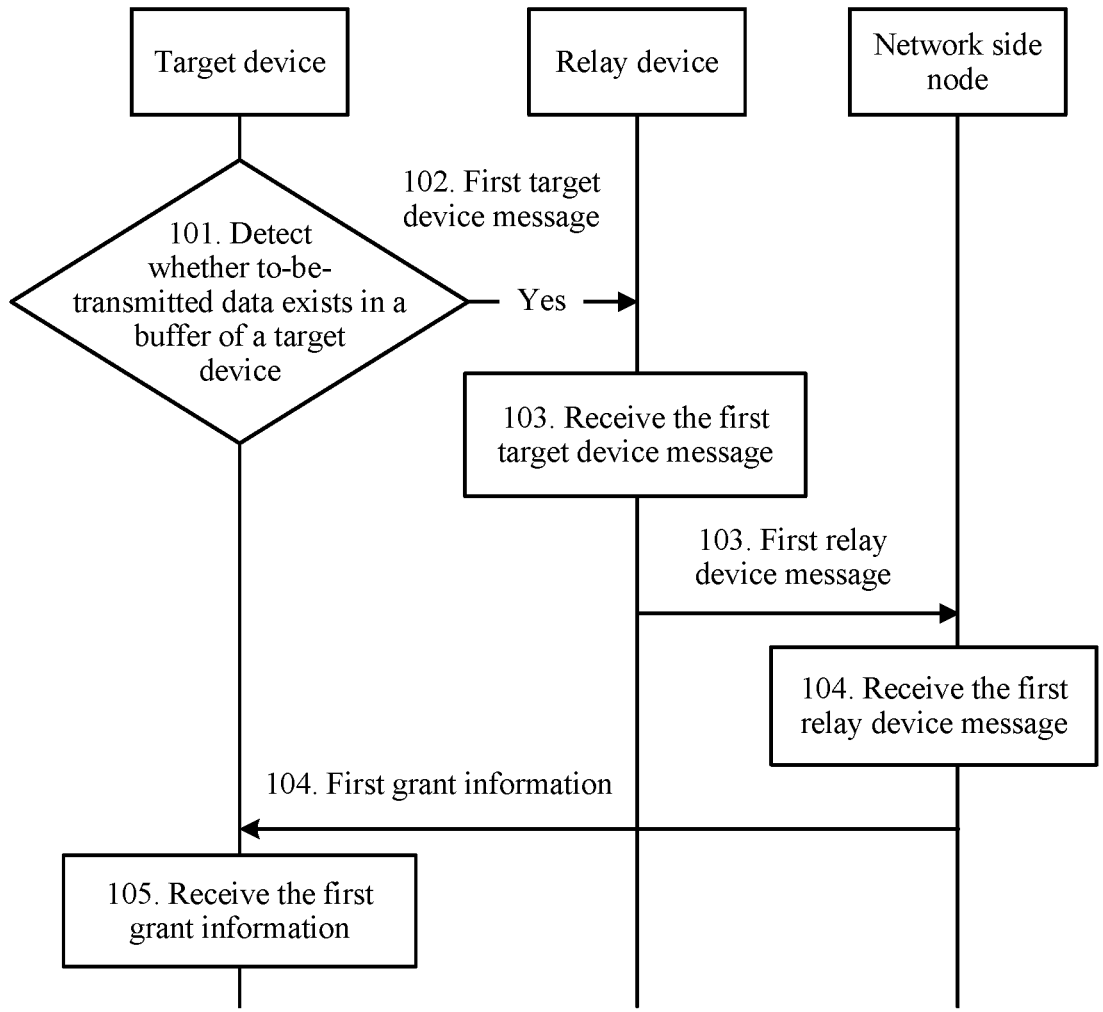
FIG. 2 is a schematic flowchart of a resource request method according to Embodiment 1 of the present disclosure.
Figure 3:
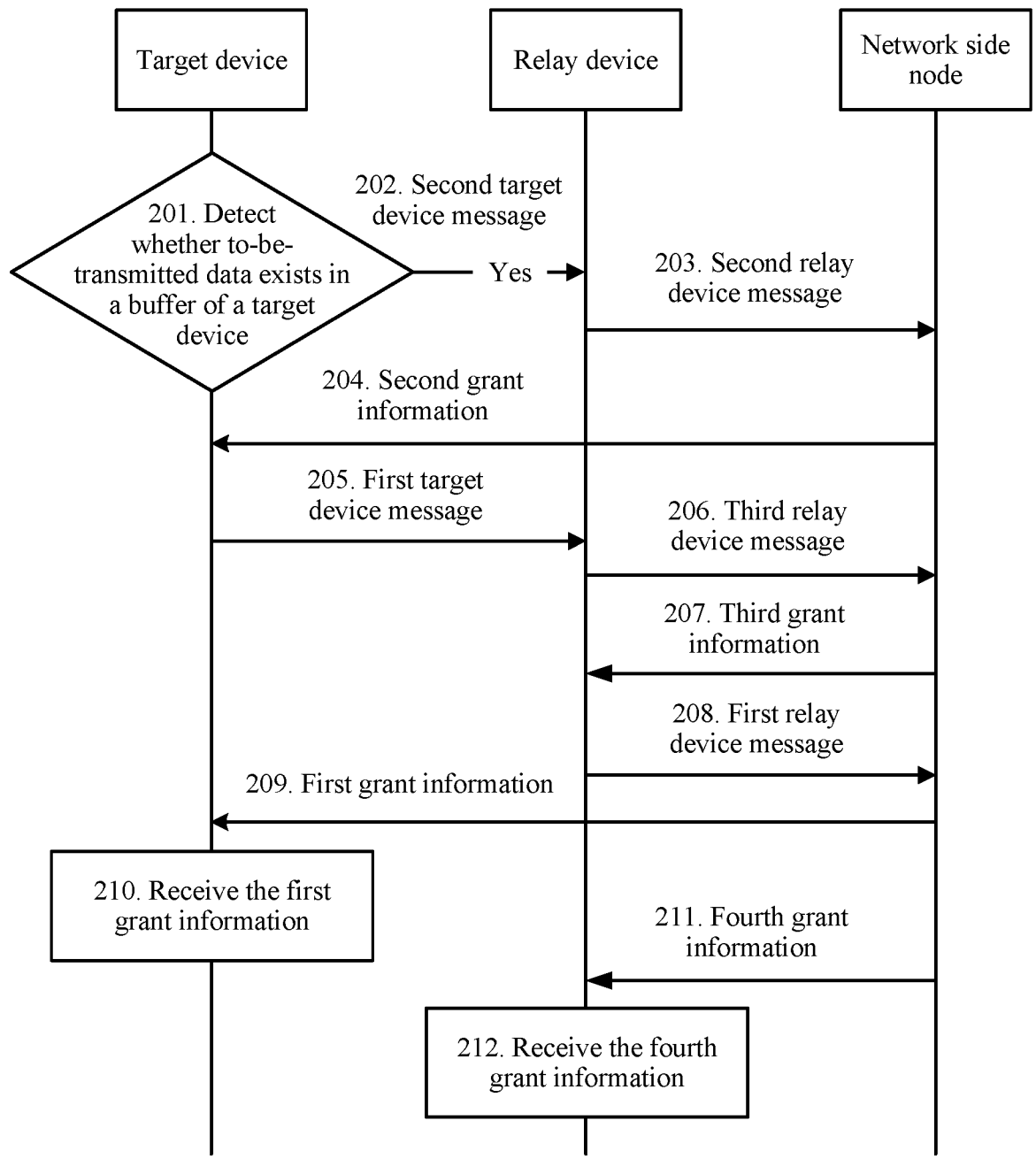
FIG. 3 is a schematic flowchart of a resource request method according to Embodiment 2 of the present disclosure.
Figure 4:
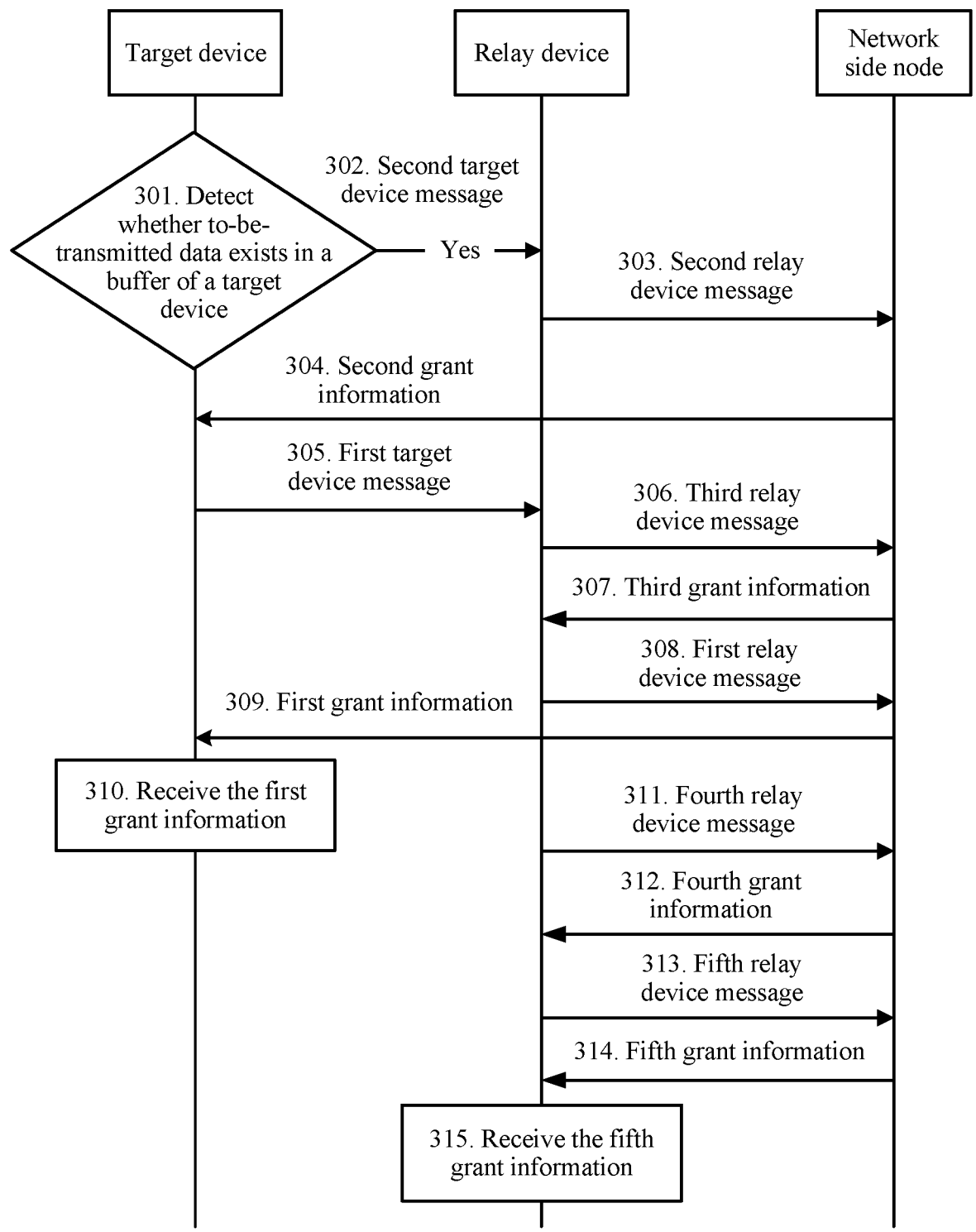
FIG. 4 is a schematic flowchart of a resource request method according to Embodiment 3 of the present disclosure.

With reference to FIG. 2 to FIG. 4, the resource request method provided in the embodiments of the present disclosure is described in detail below.

Referring to FIG. 2, FIG. 2 is a schematic flowchart of a resource request method according to Embodiment 1 of the present disclosure. As shown in FIG. 2, the method provided in Embodiment 1 of the present disclosure may include content of the following step 101 to step 105.

101. A target device detects whether to-be-transmitted data exists in a buffer of the target device.

Specifically, the target device detects whether the to-be-transmitted data exists in the buffer of the target device. The buffer is memory in which output data or input data is temporarily placed. The to-be-transmitted data is to-be-sent data. The to-be-sent data is data that the target device expects to send to another user equipment, or uplink data that the target device expects to send to a network side node. The to-be-sent data may be determined by the target device according to an operation instruction sent by a user to the target device, or may be determined by the target device according to an autonomous communication requirement. If the target device detects that the to-be-transmitted data exists, it indicates that the target device may need to transmit data to the another user equipment or the network side node. However, a data transmission resource may be required by the target device for transmitting the data. In the prior art, the target device directly requests the data transmission resource from the network side node, but this accelerates consumption of a quantity of electricity of the target device having a limited quantity of electricity. Therefore, in this embodiment of the present disclosure, a relay device relatively close to the target device is used to request, in place of the target device, the data transmission resource from the network side node.

102. The target device sends a first target device message to a relay device when detecting that the to-be-transmitted data exists.

Specifically, the first target device message is a D2D sidelink buffer status report. Usually, a link is a line from a node to another neighboring node without any switching node between the two nodes. The line may be a wired line, or may be a wireless line. Therefore, it can be learned that a D2D sidelink in this embodiment of the present disclosure is a wireless line between two user equipments in D2D communication. An interface between the two user equipments is a PC5 interface used to transmit data or information between the two user equipments. For details, refer to the definition of the PC5 interface in D2D communication in a 3rd Generation Partnership Project (3GPP) communications protocol.

A buffer status report (BSR) is used to provide, for the network side node, a data buffer size of to-be-sent data of user equipment in a data buffer of the user equipment. The D2D sidelink buffer status report (SL-BSR) is used by the target device to provide, for the relay device, a data buffer size of the to-be-transmitted data of the target device in the buffer of the target device. When detecting that the to-be-transmitted data exists, the target device sends the D2D sidelink buffer status report to the relay device, to notify the relay device of the data size of the to-be-transmitted data. If the network side node configures, for a PC5 interface between the target device and the relay device, a resource used by the target device to send the D2D sidelink buffer status report to the relay device, that is, a D2D sidelink buffer status report resource, the target device sends the first target device message, that is, the D2D sidelink buffer status report, to the relay device by using the PC5 interface between the target device and the relay device and the D2D sidelink buffer status report resource. In this embodiment of the present disclosure, by default, the network side node has preconfigured the D2D sidelink buffer status report resource for the PC5 interface between the target device and the relay device. In this way, when detecting that the to-be-transmitted data exists, the target device can directly send the D2D sidelink buffer status report to the relay device. The D2D sidelink buffer status report is used to trigger the relay device to request the network side node to allocate the data transmission resource to the target device. This changes a manner in the prior art in which the target device directly requests the network side node to allocate the data transmission resource to the target device.

103. The relay device receives the first target device message, and sends a first relay device message to a network side node.

Specifically, the first relay device message is an extended buffer status report. For example, the relay device identifies a received message, to determine whether the message is the D2D sidelink buffer status report. Optionally, the relay device detects whether data exists on the D2D sidelink buffer status report resource of the PC5 interface between the target device and the relay device, and when detecting that the data exists on the D2D sidelink buffer status report resource, determines that the message received by the relay device is the D2D sidelink buffer status report. A data size is not limited herein. Optionally, the relay device detects whether a first preset logical channel identifier exists in a D2D logical channel identifier, and when detecting that the first preset logical channel identifier exists, determines that the message received by the relay device is the D2D sidelink buffer status report. The first preset logical channel identifier is an identifier specified for the D2D sidelink buffer status report on a D2D sidelink shared channel (SL-SCH) in a D2D communications standard protocol.

Specifically, when the relay device receives the D2D sidelink buffer status report, the relay device obtains an extended-buffer-status-report resource configured by the network side node for a Uu interface between the relay device and the network side. The Uu interface is an interface between the relay device and the network side node, and is used to transmit data or information between the relay device and the network side node. For details, refer to the definition of the Uu interface in the 3GPP communications protocol. The extended-buffer-status-report resource is used by the relay device to send the first relay device message to the network side node. In this embodiment of the present disclosure, by default, the network side node has preconfigured the extended-buffer-status-report resource for the Uu interface between the relay device and the network side node.

The relay device sends the extended buffer status report to the network side node by using the Uu interface between the relay device and the network side node and the extended-buffer-status-report resource. The extended buffer status report is used to trigger the network side node to send first grant information to the target device. The first grant information includes the data transmission resource allocated by the network side node to the target device.

104. The network side node receives the first relay device message, and sends first grant information to the target device.

Specifically, the first grant information is data transmission resource grant information. For example, the network side node identifies a received message, to determine whether the message is the extended buffer status report. Optionally, the network side node detects whether data exists on the extended-buffer-status-report resource, and when detecting that the data exists on the extended-buffer-status-report resource, determines that the message received by the network side node is the extended buffer status report. A data size is not limited herein. Optionally, the network side node detects whether a second preset logical channel identifier exists in the logical channel identifier, and when detecting that the second preset logical channel identifier exists, determines that the message received by the network side node is the extended buffer status report. The second preset logical channel identifier is an identifier specified for the extended buffer status report on an uplink shared channel (UL-SCH) in the D2D communications standard protocol. Optionally, when receiving a Media Access Control (MAC) packet indicated by the preset logical channel identifier, the network side node determines that the network side node receives the extended buffer status report.

Specifically, when the network side node receives the extended buffer status report, the network side node sends the first grant information, that is, the data transmission resource grant information, to the target device. The data transmission resource grant information includes the data transmission resource allocated by the network side node to the target device. The data transmission resource is used by the target device to transmit the to-be-transmitted data.

105. The target device receives the first grant information.

Specifically, the target device receives the first grant information, that is, the data transmission resource grant information. The data transmission resource grant information includes the data transmission resource allocated by the network side node to the target device. Optionally, the data transmission resource is used by the target device to transmit the to-be-transmitted data to the relay device. When the target device receives the data transmission resource grant information, the target device sends the to-be-transmitted data to the relay device by using the PC5 interface and the data transmission resource. When receiving the to-be-transmitted data sent by the target device, the relay device may store the to-be-transmitted data in a buffer of the relay device, or may forward the to-be-transmitted data to the network side node. Optionally, the data transmission resource is used by the target device to transmit the to-be-transmitted data to the network side node. When the target device receives the data transmission resource grant information, the target device sends the to-be-transmitted data to the network side node by using a Uu interface between the target device and the network side node and the data transmission resource.

In this embodiment of the present disclosure, when detecting that the to-be-transmitted data exists in the buffer of the target device, the target device sends the first target device message to the relay device. When receiving the first target device message, the relay device sends the first relay device message to the network side node according to the first target device message. The network side node receives the first relay device message, and sends the first grant information to the target device according to the first relay device message. The first grant information includes the data transmission resource allocated by the network side node to the target device. Therefore, the relay device requests, in place of the target device, the data transmission resource from the network side node, so as to reduce energy consumption of the target device while the target device obtains the transmission resource.

Referring to FIG. 3, FIG. 3 is a schematic flowchart of a resource request method according to Embodiment 2 of the present disclosure. As shown in FIG. 3, the method provided in Embodiment 2 of the present disclosure may include content of the following step 201 to step 212.

201. A target device detects whether to-be-transmitted data exists in a buffer of the target device.

Specifically, the target device detects whether the to-be-transmitted data exists in the buffer of the target device. The buffer is memory in which output data or input data is temporarily placed. The to-be-transmitted data is to-be-sent data. The to-be-sent data is data that the target device expects to send to another user equipment, or uplink data that the target device expects to send to a network side node. The to-be-sent data may be determined by the target device according to an operation instruction sent by a user to the target device, or may be determined by the target device according to an autonomous communication requirement. If the target device detects that the to-be-transmitted data exists, it indicates that the target device may need to transmit data to the another user equipment or the network side node. However, a data transmission resource may be required by the target device for transmitting the data. In the prior art, the target device directly requests the data transmission resource from the network side node, but this accelerates consumption of a quantity of electricity of the target device having a limited quantity of electricity. Therefore, in this embodiment of the present disclosure, a relay device relatively close to the target device is used to request, in place of the target device, the data transmission resource from the network side node.

202. The target device sends a second target message to a relay device when detecting that the to-be-transmitted data exists.

Specifically, the second target device message is a D2D sidelink request message. Usually, a link is a line from a node to another neighboring node without any switching node between the two nodes. The line may be a wired line, or may be a wireless line. Therefore, it can be learned that a D2D sidelink in this embodiment of the present disclosure is a wireless line between two user equipments in D2D communication. An interface between the two user equipments is a PC5 interface used to transmit data or information between the two user equipments.

A scheduling request (SR) is used to request an uplink shared channel resource for sending uplink data. Once a scheduling request is triggered, the scheduling request is always in a suspended state until the scheduling request is cancelled. That is, when the current scheduling request is met or is responded to, the current scheduling request is cancelled; or when the scheduling request is unnecessary, the current scheduling request is cancelled. The D2D sidelink request message is a D2D sidelink scheduling request (SL-SR) used to request, on a D2D sidelink, the relay device to request, from the network side node, a D2D sidelink channel resource used by the target device to send a message, data, or the like to the relay device.

Specifically, when the target device detects that the to-be-transmitted data exists, the target device sends the second target device message, that is, the D2D sidelink request message, to the relay device by using a PC5 interface between the target device and the relay device. The D2D sidelink request message is used to trigger the relay device to request the network side node to configure a D2D sidelink buffer status report resource for the target device. In this embodiment of the present disclosure, the network side node does not preconfigure the D2D sidelink buffer status report resource for the target device, and therefore the target device may need to request the D2D sidelink buffer status report resource for the target device by using the relay device.

203. The relay device receives the second target device message, and sends a second relay device message to a network side node.

Specifically, the second relay device message is an extended request message. For example, the relay device identifies a received message, to determine whether the message is the D2D sidelink request message. Optionally, the relay device detects whether data exists on a D2D sidelink scheduling request resource, and when the data exists on the D2D sidelink scheduling request resource, determines that the message received by the relay device is the D2D sidelink request message. A data size is not limited herein. The D2D sidelink scheduling request resource is used by the target device to send the D2D sidelink request message to the relay device. In this embodiment of the present disclosure, the network side node preconfigures the D2D sidelink scheduling request resource for the PC5 interface between the target device and the relay device, so that the target device sends the D2D sidelink request message to the relay device.

When the relay device receives the D2D sidelink request message, the relay device sends the second relay device message to the network side node by using a Uu interface between the relay device and the network side node. The Uu interface is an interface between the relay device and the network side node, and is used to transmit information between the relay device and the network side node. The extended request message is used to trigger the network side node to send second grant information to the target device. The second grant information includes the D2D sidelink buffer status report resource configured by the network side node for the target device. The D2D sidelink buffer status report resource is used by the target device to send the D2D sidelink buffer status report to the relay device by using the PC5 interface.

204. The network side node receives the second relay device message, and sends second grant information to the target device.

Specifically, the second grant information is D2D sidelink buffer status report grant information. For example, the network side node identifies a received message, to determine whether the message is the extended request message. The extended request message is an extended scheduling request used to request the network side node to allocate, to the target device, a resource used by the target device to send the D2D sidelink buffer status report to the relay device, that is, a resource used to send the first target device message. Optionally, the network side node detects whether data exists on an extended-scheduling-request resource, and when detecting that the data exists on the extended-scheduling-request resource, determines that the message received by the network side node is the extended request message. A data size is not limited herein. The extended-scheduling-request resource is used by the relay device to send the extended scheduling request to the network side node. In this embodiment of the present disclosure, the network side node preconfigures the extended-scheduling-request resource for the Uu interface between the relay device and the network side node, so that the relay device sends the extended request message to the network side node.

When receiving the second relay device message, the network side node sends the second grant information, that is, the D2D sidelink buffer status report resource grant information, to the target device. The D2D sidelink buffer status report resource grant information includes the D2D sidelink buffer status report resource configured by the network side node for the target device. The D2D sidelink buffer status report resource is used by the target device to send the D2D sidelink buffer status report to the relay device.

205. The target device receives the second grant information, and sends a first target device message to the relay device.

Specifically, the first target device message is the D2D sidelink buffer status report. A buffer status report is used to provide, for the network side node, a data buffer size of to-be-sent data of user equipment in a data buffer of the user equipment. The D2D sidelink buffer status report is used by the target device to provide, for the relay device, a data buffer size of the to-be-transmitted data of the target device in the buffer of the target device.

When receiving the D2D sidelink buffer status report grant information, the target device sends the D2D sidelink buffer status report to the relay device by using the PC5 interface between the target device and the relay device and the D2D sidelink buffer status report resource in the D2D sidelink buffer status report grant information. The D2D sidelink buffer status report is used to trigger the relay device to request the network side node to allocate the data transmission resource to the target device. This changes a manner in the prior art in which the target device directly requests the network side node to allocate the data transmission resource to the target device.

In this embodiment of the present disclosure, the network side node does not preconfigure the D2D sidelink buffer status report resource for the PC5 interface between the target device and the relay device. Therefore, the target device may need to request the D2D sidelink buffer status report resource. In the process, the target device does not directly request the D2D sidelink buffer status report resource from the network side node, but requests the D2D sidelink buffer status report resource from the network side node by using the relay device. In comparison with a case in which the target device directly requests the D2D sidelink buffer status report resource from the network side node, energy consumption of the target device is greatly reduced when the target device requests the D2D sidelink buffer status report resource from the network side node by using the relay device. In Embodiment 1, the network side node has preconfigured the D2D sidelink buffer status report resource for the PC5 interface between the target device and the relay device. Therefore, in Embodiment 1, the target device can directly send the D2D sidelink buffer status report to the relay device by using the D2D sidelink buffer status report resource. However, in this embodiment of the present disclosure, when receiving the D2D sidelink buffer status report resource, the target device sends the D2D sidelink buffer status report to the relay device by using the D2D sidelink buffer status report resource.

206. The relay device receives the first target device message, and sends a third relay device message to the network side node.

Specifically, the third relay device message is an extended-buffer-status-report request message. For example, the relay device identifies a received message, to determine whether the message is the D2D sidelink buffer status report. Optionally, the relay device detects whether data exists on the D2D sidelink buffer status report resource of the PC5 interface between the target device and the relay device, and when detecting that the data exists on the D2D sidelink buffer status report resource, determines that the message received by the relay device is the D2D sidelink buffer status report. A data size is not limited herein. Optionally, the relay device detects whether a first preset logical channel identifier exists in a D2D logical channel identifier, and when detecting that the first preset logical channel identifier exists, determines that the message received by the relay device is the D2D sidelink buffer status report. The first preset logical channel identifier is an identifier specified for the D2D sidelink buffer status report on a D2D sidelink shared channel in a D2D communications standard protocol.

Specifically, in this embodiment of the present disclosure, the network side node does not preconfigure an extended-buffer-status-report resource for the Uu interface between the relay device and the network side node. The extended-buffer-status-report resource is used by the relay device to send an extended buffer status report to the network side node. Therefore, when receiving the D2D sidelink buffer status report, the relay device cannot directly send the extended buffer status report to the network side node, but may need to first request the extended-buffer-status-report resource from the network side node. The relay device sends the extended-buffer-status-report request message to the network side node, to request the extended-buffer-status-report resource. The extended-buffer-status-report request message is an extended-buffer-status-report scheduling request used to request the network side node to configure the extended-buffer-status-report resource for the relay device.

207. The network side node receives the third relay device message, and sends third grant information to the relay device.

Specifically, the third grant information is extended-buffer-status-report resource grant information. The network side node detects whether the network side node receives the third relay device message, and when receiving the third relay device message, sends the third grant information, that is, the extended-buffer-status-report resource grant information, to the relay device. The extended-buffer-status-report resource grant information includes the extended-buffer-status-report resource configured by the network side node for the relay device.

208. The relay device receives the third grant information, and sends a first relay device message to the network side node.

Specifically, the first relay device message is the extended buffer status report. The relay device receives the third grant information, and sends the first relay device message, that is, the extended buffer status report, to the network side node by using the Uu interface between the relay device and the network side node and the extended-buffer-status-report resource in the extended-buffer-status-report resource grant information. The extended buffer status report is used to trigger the network side node to send data transmission resource grant information to the target device. The data transmission resource grant information includes the data transmission resource allocated by the network side node to the target device.

In this embodiment of the present disclosure, the network side node does not preconfigure the extended-buffer-status-report resource for the Uu interface between the relay device and the network side node. Therefore, the relay device cannot directly send the extended buffer status report to the network side node, but may need to request the extended-buffer-status-report resource from the network side node. In Embodiment 1, the network side node has preconfigured the extended-buffer-status-report resource for the Uu interface between the relay device and the network side node, and therefore the relay device can directly send the extended buffer status report to the network side node by using the extended-buffer-status-report resource.

209. The network side node receives the first relay device message, and sends first grant information to the target device.

Specifically, the first grant information is the data transmission resource grant information. For example, the network side node identifies a received message, to determine whether the message is the extended buffer status report. Optionally, the network side node detects whether data exists on the extended-buffer-status-report resource, and when detecting that the data exists on the extended-buffer-status-report resource, determines that the message received by the network side node is the extended buffer status report. A data size is not limited herein. Optionally, the network side node detects whether a second preset logical channel identifier exists in the logical channel identifier, and when detecting that the second preset logical channel identifier exists, determines that the network side node receives the extended buffer status report. The second preset logical channel identifier is an identifier specified for the extended buffer status report on an uplink shared channel in the D2D communications standard protocol. Optionally, when receiving a Media Access Control packet indicated by the preset logical channel identifier, the network side node determines that the network side node receives the extended buffer status report.

Specifically, when the network side node receives the first relay device message, the network side node sends the first grant information, that is, the data transmission resource grant information, to the target device. The data transmission resource grant information includes the data transmission resource allocated by the network side node to the target device. The data transmission resource is used by the target device to transmit the to-be-transmitted data.

210. The target device receives the first grant information.

Specifically, the target device receives the first grant information, that is, the data transmission resource grant information. The data transmission resource grant information includes the data transmission resource allocated by the network side node to the target device. The data transmission resource is used by the target device to transmit the to-be-transmitted data to the relay device. When the target device receives the data transmission resource grant information, the target device sends the to-be-transmitted data to the relay device by using the PC5 interface and the data transmission resource.

211. The network side node sends fourth grant information to the relay device.

Specifically, the fourth grant information is data forwarding resource grant information. The extended buffer status report message is further used to trigger the network side node to send the data forwarding resource grant information to the relay device. After receiving the extended buffer status report sent by the relay device, the network side node sends the fourth grant information, that is, the data forwarding resource grant information, to the relay device. The data forwarding resource grant information includes a data forwarding resource allocated by the network side node to the relay device. The data forwarding resource is used by the relay device to forward the to-be-transmitted data.

212. The relay device receives the fourth grant information.

Specifically, the relay device receives the data forwarding resource grant information. If the relay device also receives the to-be-transmitted data transmitted by the target device, the relay device transmits the to-be-transmitted data to the network side node by using the Uu interface between the relay device and the network side node and the data forwarding resource in the data forwarding resource grant information.

In this embodiment of the present disclosure, the target device does not directly send a scheduling request and a buffer status report to the network side node, but sends the D2D sidelink request message and the D2D sidelink buffer status report to the relay device relatively close to the target device. This greatly reduces energy consumption of the target device in comparison with a case in which the target device directly sends the scheduling request and the buffer status report to the network side node.

In this embodiment of the present disclosure, the target device sends the D2D sidelink request message to the relay device, and sends the D2D sidelink buffer status report to the relay device when receiving the D2D sidelink buffer status report grant information. When receiving the D2D sidelink buffer status report, the relay device sends the extended buffer status report to the network side node according to the D2D sidelink buffer status report. The network side node receives the extended buffer status report, and sends the data transmission resource grant information to the target device according to the extended buffer status report. The data transmission resource grant information includes the data transmission resource allocated by the network side node to the target device. Therefore, the relay device requests, in place of the target device, the resource from the network side node, so as to reduce energy consumption of the target device while the target device obtains the transmission resource.

Referring to FIG. 4, FIG. 4 is a schematic flowchart of a resource request method according to Embodiment 3 of the present disclosure. As shown in FIG. 4, the method provided in Embodiment 3 of the present disclosure may include content of the following step 301 to step 315.

301. A target device detects whether to-be-transmitted data exists in a buffer of the target device.

302. The target device sends a second target message to a relay device when detecting that the to-be-transmitted data exists.

303. The relay device receives the second target device message, and sends a second relay device message to a network side node.

304. The network side node receives the second relay device message, and sends second grant information to the target device.

305. The target device receives the second grant information, and sends a first target device message to the relay device.

306. The relay device receives the first target device message, and sends a third relay device message to the network side node.

307. The network side node receives the third relay device message, and sends third grant information to the relay device.

308. The relay device receives the third grant information, and sends a first relay device message to the network side node.

309. The network side node receives the first relay device message, and sends first grant information to the target device.

310. The target device receives the first grant information.

For a specific implementation process of step 301 to step 310, refer to the detailed descriptions of step 201 to step 210 in Embodiment 2 shown in FIG. 3.

311. The relay device sends a fourth relay device message to the network side node.

Specifically, the fourth relay device message is a data forwarding request message. A difference between this embodiment of the present disclosure and Embodiment 2 is as follows: In Embodiment 2, the network side node allocates the data forwarding resource grant information to the relay device according to the extended buffer status report, that is, the network side node allocates the data forwarding resource to the relay device, and the relay device can directly use the data forwarding resource. However, in this embodiment of the present disclosure, the network side node does not allocate the data forwarding resource to the relay device according to the extended buffer status report, and therefore the relay device may need to request the data forwarding resource from the network side node. The relay device first sends the data forwarding request message, that is, a data forwarding scheduling request, to the network side node, to request the network side node to allocate the data forwarding resource to the relay device.

312. The network side node receives the fourth relay device message, and sends fourth grant information to the relay device.

Specifically, the fourth grant information is data forwarding request grant information. The network side node receives the data forwarding request message, and sends the data forwarding request grant information to the relay device according to the data forwarding request message. The data forwarding request grant information includes a resource that is configured by the network side node for the relay device and that is used to send a buffer status report.

313. The relay device receives the fourth grant information, and sends a fifth relay device message to the network side node.

Specifically, the fifth relay device message is the buffer status report. The relay device receives the request grant information, and sends the buffer status report to the network side node by using a Uu interface between the relay device and the network side node and the resource that is configured by the network side node for the relay device and that is used to send the buffer status report. The buffer status report is used to: notify the network side node of a data buffer size of the to-be-transmitted data in a buffer of the relay device, and request the network side node to allocate the data forwarding resource to the relay device according to the buffer status report. The data forwarding resource is used by the relay device to forward the to-be-transmitted data.

314. The network side node receives the fifth relay device message, and sends fifth grant information to the relay device.

Specifically, the fifth grant information is the data forwarding resource grant information. The network side node receives the buffer status report, and sends the data forwarding resource grant information to the relay device according to the buffer status report. The data forwarding resource grant information includes the data forwarding resource allocated by the network side node to the relay device.

315. The relay device receives the fifth grant information.

Specifically, the relay device receives the fifth grant information, that is, the data forwarding resource grant information. If the relay device also receives the to-be-transmitted data transmitted by the target device, the relay device transmits the to-be-transmitted data to the network side node by using the Uu interface between the relay device and the network side node and the data forwarding resource in the data forwarding resource grant information.

In this embodiment of the present disclosure, the target device does not directly send a scheduling request and a buffer status report to the network side node, but sends the D2D sidelink request message and the D2D sidelink buffer status report to the relay device relatively close to the target device. This greatly reduces energy consumption of the target device in comparison with a case in which the target device directly sends the scheduling request and the buffer status report to the network side node.

In this embodiment of the present disclosure, the target device sends the D2D sidelink request message to the relay device, and sends the D2D sidelink buffer status report to the relay device when receiving D2D sidelink buffer status report grant information. When receiving the D2D sidelink buffer status report, the relay device sends the extended buffer status report to the network side node according to the D2D sidelink buffer status report. The network side node receives the extended buffer status report, and sends data transmission resource grant information to the target device according to the extended buffer status report. The data transmission resource grant information includes a data transmission resource allocated by the network side node to the target device. Therefore, the relay device requests, in place of the target device, the resource from the network side node, so as to reduce energy consumption of the target device while the target device obtains the transmission resource.

It should be noted that the method shown in Embodiment 1 is a resource request method. That is, the network side node preconfigures the D2D sidelink buffer status report resource for the target device, and preconfigures the extended-buffer-status-report resource for the relay device. In the method shown in Embodiment 2, the target device may need to request the D2D sidelink buffer status report resource, and the relay device may need to request the extended-buffer-status-report resource. The method shown in Embodiment 3 is based on that in Embodiment 2. However, in Embodiment 3, the network side node does not allocate the data forwarding resource to the relay device when receiving the extended buffer status report, and therefore in Embodiment 3, the relay device may need to request the data forwarding resource from the network side node.

Figure 5:
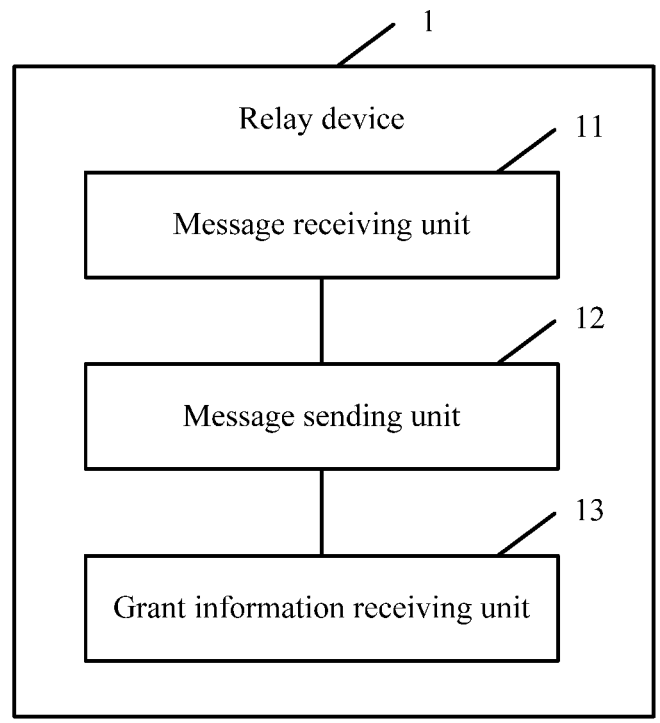
FIG. 5 is a schematic structural diagram of a relay device according to an embodiment of the present disclosure.

Referring to FIG. 5, FIG. 5 is a schematic structural diagram of a relay device according to an embodiment of the present disclosure. A relay device 1 provided in the embodiment corresponding to FIG. 5 may be the relay device provided in Embodiment 1 to Embodiment 3. The relay device includes a message receiving unit 11, a message sending unit 12, and a grant information receiving unit 13.

The message receiving unit 11 is configured to receive a first target device message sent by a target device.

In specific implementation, the first target device message is a D2D sidelink buffer status report. The message receiving unit 11 identifies a received message, to determine whether the message is the D2D sidelink buffer status report. Optionally, the message receiving unit 11 detects whether data exists on the D2D sidelink buffer status report resource of a PC5 interface between the target device and the relay device 1, and when detecting that the data exists on the D2D sidelink buffer status report resource, determines that the message received by the message receiving unit 11 is the D2D sidelink buffer status report. A data size is not limited herein. Optionally, the message receiving unit 11 detects whether a first preset logical channel identifier exists in a D2D logical channel identifier, and when detecting that the first preset logical channel identifier exists, determines that the message received by the message receiving unit 11 is the D2D sidelink buffer status report. The first preset logical channel identifier is an identifier specified for the D2D sidelink buffer status report on a D2D sidelink shared channel in a D2D communications standard protocol.

The message sending unit 12 is configured to send a first relay device message to the network side node according to the first target device message.

In specific implementation, the first relay device message is an extended buffer status report. When the message receiving unit 11 receives the D2D sidelink buffer status report, the relay device 1 obtains an extended-buffer-status-report resource configured by the network side node for a Uu interface between the relay device and the network side. The Uu interface is an interface between the relay device 1 and the network side node, and is used to transmit data or information between the relay device 1 and the network side node. The extended-buffer-status-report resource is used by the message sending unit 12 to send the first relay device message to the network side node. In this embodiment of the present disclosure, by default, the network side node has preconfigured the extended-buffer-status-report resource for the Uu interface between the relay device 1 and the network side node.

The message sending unit 12 sends the extended buffer status report to the network side node by using the Uu interface between the relay device 1 and the network side node and the extended-buffer-status-report resource. The extended buffer status report is used to trigger the network side node to send first grant information to the target device. The first grant information includes the data transmission resource allocated by the network side node to the target device.

The message receiving unit 11 is further configured to receive a second target device message sent by the target device.

In specific implementation, the second target device message is a D2D sidelink request message. The message receiving unit 11 identifies a received message, to determine whether the message is the D2D sidelink request message. Optionally, the message receiving unit 11 detects whether data exists on a D2D sidelink scheduling request resource, and when the data exists on the D2D sidelink scheduling request resource, determines that the message received by the message receiving unit 11 is the D2D sidelink request message. A data size is not limited herein. The D2D sidelink scheduling request resource is used by the target device to send the D2D sidelink request message to the relay device 1. In this embodiment of the present disclosure, the network side node preconfigures the D2D sidelink scheduling request resource for the PC5 interface between the target device and the relay device 1, so that the target device sends the D2D sidelink request message to the relay device 1.

The message sending unit 12 is further configured to send a second relay device message to the network side node according to the second target device message, where the second relay device message is used to trigger the network side node to send second grant information to the target device, and the second grant information includes the D2D sidelink buffer status report resource configured by the network side node for the target device.

In specific implementation, the second relay device message is an extended request message. When the message receiving unit 11 receives the D2D sidelink request message, the message sending unit 12 sends the second relay device message to the network side node by using the Uu interface between the relay device and the network side node. The Uu interface is an interface between the relay device 1 and the network side node, and is used to transmit information between the relay device 1 and the network side node. The extended request message is used to trigger the network side node to send the second grant information to the target device. The second grant information includes the D2D sidelink buffer status report resource configured by the network side node for the target device. The D2D sidelink buffer status report resource is used by the target device to send the D2D sidelink buffer status report to the relay device 1 by using the PC5 interface.

The message sending unit 12 is further configured to send a third relay device message to the network side node, where the third relay device message is used to request the network side node to configure an extended-buffer-status-report resource for the relay device.

In specific implementation, the third relay device message is an extended-buffer-status-report request message. In this case, if the network side node does not preconfigure the extended-buffer-status-report resource for the Uu interface between the relay device and the network side node, where the extended-buffer-status-report resource is used by the relay device to send the extended buffer status report to the network side node, when the message receiving unit 11 receives the D2D sidelink buffer status report, the message sending unit 12 cannot directly send the extended buffer status report to the network side node, but the message sending unit 12 may need to first request the extended-buffer-status-report resource from the network side node. The message sending unit 12 sends the extended-buffer-status-report request message to the network side node, to obtain the extended-buffer-status-report resource. The extended-buffer-status-report request message is an extended-buffer-status-report scheduling request used to request the network side node to configure the extended-buffer-status-report resource for the relay device.

The grant information receiving unit 13 is configured to receive third grant information sent by the network side node, where the third grant information includes the extended-buffer-status-report resource configured by the network side node for the relay device.

In specific implementation, the third grant information is extended-buffer-status-report resource grant information.

The message sending unit 12 is specifically configured to send the first relay device message to the network side node according to the first target device message by using the extended-buffer-status-report resource.

The grant information receiving unit 13 is further configured to receive the fourth grant information sent by the network side node, where the fourth grant information includes a data forwarding resource allocated by the network side node to the relay device, and the data forwarding resource is used by the relay device to forward the to-be-transmitted data.

In specific implementation, the fourth grant information is data forwarding resource grant information. The first relay device message is further used to trigger the network side node to send the fourth grant information to the relay device. The grant information receiving unit 13 receives the data forwarding resource grant information sent by the network side node. The data forwarding resource grant information includes the data forwarding resource allocated by the network side node to the relay device, and the data forwarding resource is used by the relay device to forward the to-be-transmitted data. If the relay device 1 also receives the to-be-transmitted data transmitted by the target device, the relay device 1 transmits the to-be-transmitted data to the network side node by using the Uu interface between the relay device 1 and the network side node and the data forwarding resource in the data forwarding resource grant information.

In this embodiment of the present disclosure, the relay device receives the D2D sidelink buffer status report sent by the target device, and sends the extended buffer status report to the network side node according to the D2D sidelink buffer status report. The extended buffer status report is used to request the network side node to allocate the data transmission resource to the target device. Therefore, the relay device requests, in place of the target device, the data transmission resource from the network side node, so as to reduce energy consumption of the target device while the target device obtains the transmission resource.

Figure 6:
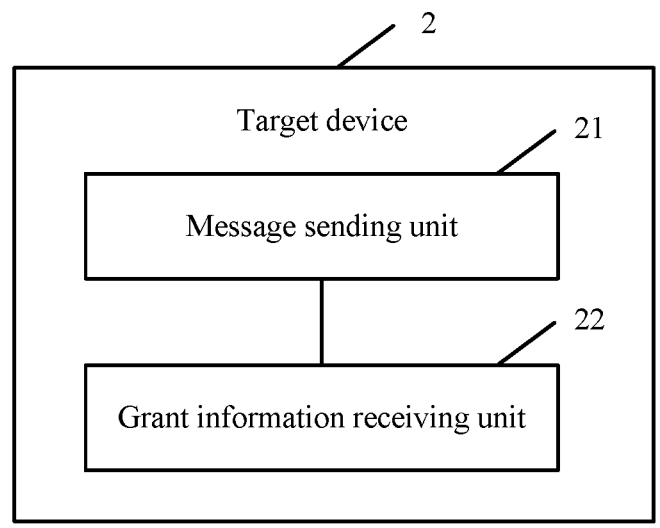
FIG. 6 is a schematic structural diagram of a target device according to an embodiment of the present disclosure.

Referring to FIG. 6, FIG. 6 is a schematic structural diagram of a target device according to an embodiment of the present disclosure. A target device 2 provided in the embodiment corresponding to FIG. 6 may be the target device provided in Embodiment 1 to Embodiment 3. The target device includes a message sending unit 21 and a grant information receiving unit 22.

The message sending unit 21 is configured to send a first target device message to a relay device.

In specific implementation, before the message sending unit 21 sends the first target device message to the relay device, the target device 2 detects whether to-be-transmitted data exists in a buffer of the target device. The buffer is memory in which output data or input data is temporarily placed. The to-be-transmitted data is to-be-sent data. The to-be-sent data is data that the target device 2 expects to send to another user equipment, or uplink data that the target device 2 expects to send to a network side node. The to-be-transmitted data may be determined by the target device 2 according to an operation instruction sent by a user to the target device 2, or may be determined by the target device 2 according to an autonomous communication requirement. If the target device 2 detects that the to-be-transmitted data exists, it indicates that the target device 2 may need to transmit data to the another user equipment or the network side node. However, a data transmission resource may be required by the target device 2 for transmitting the data. In the prior art, the target device 2 directly requests the data transmission resource from the network side node, but this accelerates consumption of a quantity of electricity of the target device having a limited quantity of electricity. Therefore, in this embodiment of the present disclosure, the relay device relatively close to the target device 2 is used to request, in place of the target device 2, the data transmission resource from the network side node.

Usually, a link is a line from a node to another neighboring node without any switching node between the two nodes. The line may be a wired line, or may be a wireless line. Therefore, it can be learned that a D2D sidelink in this embodiment of the present disclosure is a wireless line between two user equipments in D2D communication. An interface between the two user equipments is a PC5 interface used to transmit data or information between the two user equipments.

A buffer status report is used to provide, for the network side node, a data buffer size of to-be-sent data of user equipment in a data buffer of the user equipment. The D2D sidelink buffer status report is used by the target device 2 to provide, for the relay device, a data buffer size of the to-be-transmitted data of the target device 2 in the buffer of the target device 2. When the target device 2 detects that the to-be-transmitted data exists, the message sending unit 21 sends the D2D sidelink buffer status report to the relay device, to notify the relay device of the data size of the to-be-transmitted data. If the network side node configures, for a PC5 interface between the target device 2 and the relay device, a resource used by the target device 2 to send the D2D sidelink buffer status report to the relay device, that is, a D2D sidelink buffer status report resource, the message sending unit 21 sends the first target message, that is, the D2D sidelink buffer status report, to the relay device by using the PC5 interface between the target device and the relay device and the D2D sidelink buffer status report resource. In this embodiment of the present disclosure, by default, the network side node has preconfigured the D2D sidelink buffer status report resource for the PC5 interface between the target device 2 and the relay device. In this way, when the target device 2 detects that the to-be-transmitted data exists, the message sending unit 21 can directly send the D2D sidelink buffer status report to the relay device. The D2D sidelink buffer status report is used to trigger the relay device to request the network side node to allocate the data transmission resource to the target device 2. This changes a manner in the prior art in which the target device 2 directly requests the network side node to allocate the data transmission resource to the target device 2.

The grant information receiving unit 22 is configured to receive first grant information sent by the network side node, where the first grant information includes the data transmission resource allocated by the network side node to the target device.

In specific implementation, the first grant information is data transmission resource grant information. The grant information receiving unit 22 receives the data transmission resource grant information. The data transmission resource grant information includes the data transmission resource allocated by the network side node to the target device 2. Optionally, the data transmission resource is used by the target device 2 to transmit the to-be-transmitted data to the relay device. When the grant information receiving unit 22 receives the data transmission resource grant information, the target device 2 sends the to-be-transmitted data to the relay device by using the PC5 interface and the data transmission resource. When receiving the to-be-transmitted data sent by the target device 2, the relay device may store the to-be-transmitted data in a buffer of the relay device, or may forward the to-be-transmitted data to the network side node. Optionally, the data transmission resource is used by the target device 2 to transmit the to-be-transmitted data to the network side node. When the grant information receiving unit 22 receives the data transmission resource grant information, the target device 2 sends the to-be-transmitted data to the network side node by using a Uu interface between the target device and the network side node and the data transmission resource.

The message sending unit 21 is configured to send a second target device message to the relay device, where the second target device message is used to trigger the relay device to request the network side node to configure a D2D sidelink buffer status report resource for the target device.

In specific implementation, the second target device message is a D2D sidelink request message. When the target device 2 detects that the to-be-transmitted data exists, the message sending unit 21 sends the D2D sidelink request message to the relay device by using the PC5 interface between the target device 2 and the relay device. The D2D sidelink request message is used to trigger the relay device to request the network side node to configure the D2D sidelink buffer status report resource for the target device 2. In this embodiment of the present disclosure, the network side node does not preconfigure the D2D sidelink buffer status report resource for the target device 2, and therefore the target device 2 may need to request the D2D sidelink buffer status report resource for the target device 2 by using the relay device.

The grant information receiving unit 22 is further configured to receive second grant information sent by the network side node, where the second grant information includes the D2D sidelink buffer status report resource configured by the network side node for the target device.

In specific implementation, the second grant information is D2D sidelink buffer status report grant information. The D2D sidelink buffer status report resource grant information includes the D2D sidelink buffer status report resource configured by the network side node for the target device. The D2D sidelink buffer status report resource is used by the target device to send the D2D sidelink buffer status report to the relay device.

The message sending unit 21 is specifically configured to send the first target device message to the relay device by using the D2D sidelink buffer status report resource in the D2D sidelink buffer status report grant information received by the grant information receiving unit 22.

In this embodiment of the present disclosure, the target device detects whether the to-be-transmitted data exists in the buffer of the target device, and sends the D2D sidelink buffer status report to the relay device when detecting that the to-be-transmitted data exists. The D2D sidelink buffer status report is used to trigger the relay device to request the network side node to allocate the data transmission resource to the target device. The target device receives the data transmission resource grant information sent by the network side node. The data transmission resource grant information includes the data transmission resource allocated by the network side node to the target device. The target device requests the data transmission resource from the network side node by using the relay device. Therefore, the relay device assists the target device in obtaining the transmission resource, and energy consumption of the target device is reduced.

Figure 7:
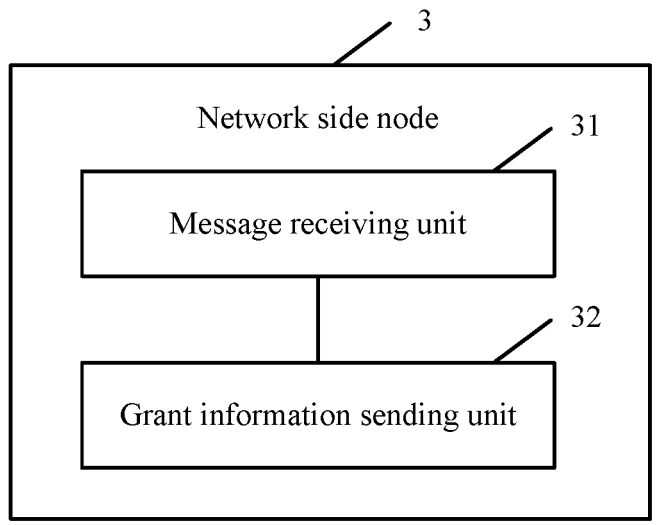
FIG. 7 is a schematic structural diagram of a network side node according to an embodiment of the present disclosure.

Referring to FIG. 7, FIG. 7 is a schematic structural diagram of a network side node according to an embodiment of the present disclosure. A network side node 3 provided in the embodiment corresponding to FIG. 7 may be the network side node provided in Embodiment 1 to Embodiment 3. The network side node includes a message receiving unit 31 and a grant information sending unit 32.

The message receiving unit 31 is configured to receive a first relay device message sent by a relay device, where the first relay device message is used to trigger the network side node to send first grant information to a target device.

In specific implementation, the first relay device message is an extended buffer status report. The first grant information is data transmission resource grant information. The message receiving unit 31 identifies a received message, to determine whether the message is the extended buffer status report. Optionally, the message receiving unit 31 detects whether data exists on the extended-buffer-status-report resource, and when detecting that the data exists on the extended-buffer-status-report resource, determines that the message received by message receiving unit 31 is the extended buffer status report. A data size is not limited herein. Optionally, the message receiving unit 31 detects whether a second preset logical channel identifier exists in a logical channel identifier, and when detecting that the second preset logical channel identifier exists, determines that the message received by the message receiving unit 31 is the extended buffer status report. The second preset logical channel identifier is an identifier specified for the extended buffer status report on an uplink shared channel in a D2D communications standard protocol. Optionally, when receiving a Media Access Control packet indicated by the preset logical channel identifier, the network side node determines that the network side node receives the extended buffer status report.

The grant information sending unit 32 is configured to send the first grant information to the target device according to the first relay device message, where the first grant information includes a data transmission resource allocated by the network side node to the target device.

In specific implementation, when the message receiving unit 31 receives the extended buffer status report, the grant information sending unit 32 sends the data transmission resource grant information to the target device. The data transmission resource grant information includes the data transmission resource allocated by the network side node to the target device. The data transmission resource is used by the target device to transmit the to-be-transmitted data. The data transmission resource is used by the target device to transmit the to-be-transmitted data in a buffer.

The message receiving unit 31 is configured to receive, by the network side node, a second relay device message sent by the relay device, where the second relay device message is used to trigger the network side node to send second grant information to the target device.

In specific implementation, the second relay device message is an extended request message. The second grant information is D2D sidelink buffer status report grant information. The message receiving unit 31 identifies a received message, to determine whether the message is the extended request message sent by the relay device. The extended request message is an extended scheduling request used to request the network side node to allocate, to the target device, a resource used by the target device to send a D2D sidelink buffer status report to the relay device, that is, a resource used to send the first relay device message. Optionally, the message receiving unit 31 detects whether data exists on an extended-scheduling-request resource, and when detecting that the data exists on the extended-scheduling-request resource, determines that the message received by the message receiving unit 31 is the extended request message. A data size is not limited herein. The extended-scheduling-request resource is used by the relay device to send the extended scheduling request to the network side node 3. In this embodiment of the present disclosure, the network side node preconfigures the extended-scheduling-request resource for a Uu interface between the relay device and the network side node 3, so that the relay device sends the extended request message to the network side node 3.

The grant information sending unit 32 is further configured to send the second grant information to the target device according to the extended request message, where the second grant information includes a D2D sidelink buffer status report resource configured by the network side node for the target device.

In specific implementation, when the message receiving unit 31 receives the extended request message, the grant information sending unit 32 sends D2D sidelink buffer status report resource grant information to the target device. The D2D sidelink buffer status report resource grant information includes the D2D sidelink buffer status report resource configured by the network side node for the target device. The D2D sidelink buffer status report resource is used by the target device to send the D2D sidelink buffer status report to the relay device.

The message receiving unit 31 is further configured to receive a third relay device message sent by the relay device, where the third relay device message is used to request the network side node to configure the extended-buffer-status-report resource for the relay device.

In specific implementation, the third relay device message is an extended-buffer-status-report request message.

The grant information sending unit 32 is further configured to send third grant information to the relay device according to the third relay device message, where the third grant information includes the extended-buffer-status-report resource configured by the network side node for the relay device.

In specific implementation, the third grant information is extended-buffer-status-report resource grant information. When the message receiving unit 31 receives the extended-buffer-status-report request message, the grant information sending unit 32 sends the extended-buffer-status-report resource grant information to the relay device according to the extended-buffer-status-report request message. The extended-buffer-status-report resource grant information includes the extended-buffer-status-report resource configured by the network side node for the relay device.

The grant information sending unit 32 is further configured to send the fourth grant information to the relay device according to the first relay device message, where the fourth grant information includes a data forwarding resource allocated by the network side node to the relay device, and the data forwarding resource is used by the relay device to forward the to-be-transmitted data.

In specific implementation, the fourth grant information is data forwarding resource grant information. The first relay device message, that is, the extended buffer status report, is further used to trigger the network side node to send the data forwarding resource grant information to the relay device. When the message receiving unit 31 receives the extended buffer status report sent by the relay device, the grant information sending unit 32 sends the data forwarding resource grant information to the relay device. The data forwarding resource grant information includes the data forwarding resource allocated by the network side node to the relay device. The data forwarding resource is used by the relay device to forward the to-be-transmitted data.

In this embodiment of the present disclosure, the network side node receives the extended buffer status report sent by the relay device, and sends the data transmission resource grant information to the target device according to the extended buffer status report. The data transmission resource grant information includes the data transmission resource allocated by the network side node to the target device. Therefore, the network side node allocates the data transmission resource to the target device according to the extended buffer status report sent by the relay device, so as to reduce energy consumption of the target device while the target device obtains the transmission resource.

The relay device shown in FIG. 5, the target device shown in FIG. 6, and the network side node shown in FIG. 7 are configured to implement the content in Embodiment 1 to Embodiment 3. For parts that are not disclosed in FIG. 5, FIG. 6, and FIG. 7, refer to the detailed descriptions in Embodiment 1 to Embodiment 3.

Figure 8:
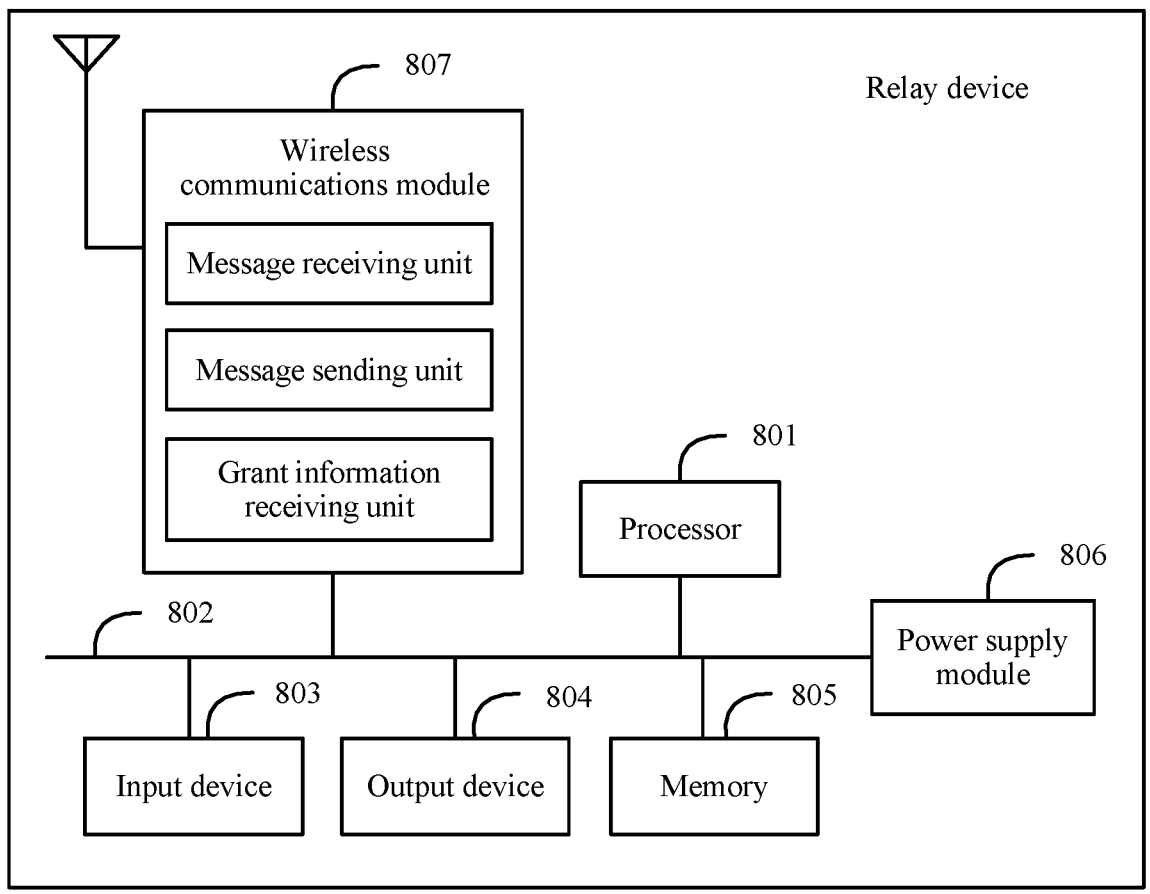
FIG. 8 is a schematic structural diagram of another relay device according to an embodiment of the present disclosure.

Referring to FIG. 8, FIG. 8 is a schematic structural diagram of another relay device according to an embodiment of the present disclosure. As shown in FIG. 8, the relay device includes at least one processor 801 such as a CPU, at least one communications bus 802, an input device 803, an output device 804, a memory 805, a power supply module 806, and a wireless communications module 807. The relay device is user equipment relatively close to a target device, and assists the target device in requesting a transmission resource from a network side node. The communications bus 802 is configured to implement connections and communication between these components. The input device 803 is configured to receive an audio signal or a video signal, and is further configured to: receive an input command of a user, and generate key input data according to the input command, to control various operations of the relay device. The output device 804 is configured to provide an output signal (for example, an audio signal, a video signal, an alert signal, or a vibrating signal) in a visual manner, an audio manner, and/or a tactile manner. The output device 804 may include a display unit, an audio output module, an alert unit, and the like that are not marked in FIG. 8. The power supply module 806 receives external power or internal power under control of the processor 801, and supplies power to the devices, the modules, the memory 805, the processor 801, and the like on the communications bus 802. The power supply module 806 of the relay device has a relatively large power capacity.

The memory 805 may include at least one type of storage medium. The storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic storage, a magnetic disk, an optical disc, and the like. The processor 801 usually controls overall operations of the relay device. For example, the processor 801 performs control and processing that are related to a voice call, data communication, a video call, or the like.

The wireless communications module 807 is an apparatus configured to send a radio signal to at least one of a base station (for example, an access point or a NodeB), an external terminal, and a server, and/or receives a radio signal from at least one of the base station, the external terminal, or the server. The radio signal may include a voice call signal, a video call signal, or various types of data that is sent and/or received according to a text message and/or a multimedia message.

The wireless communications module 807 includes a message receiving unit, a message sending unit, and a grant information receiving unit. The message receiving unit is corresponding to the message receiving unit 11 in the relay device shown in FIG. 5, and is configured to receive a first target device message sent by a target device. In a possible implementation, the message receiving unit is further configured to receive a second target device message sent by the target device. For functions of the first target device message and the second target device message, refer to the detailed descriptions of the first target device message and the second target device message in Embodiment 1 to Embodiment 3. Details are not described herein again. The message sending unit is corresponding to the message sending unit 12 in the relay device shown in FIG. 5, and is configured to send a first relay device message to a network side node. In a possible implementation, the message sending unit is further configured to send a second relay device message and a third relay device message to the network side node, and even send a fourth relay device message and a fifth relay device message to the network side node. For functions of the first relay device message, the second relay device message, the third relay device message, the fourth relay device message, and the fifth relay device message, refer to the detailed descriptions of the first relay device message, the second relay device message, the third relay device message, the fourth relay device message, and the fifth relay device message in Embodiment 1 to Embodiment 3. Details are not described herein again. The grant information receiving unit is corresponding to the grant information receiving unit 13 in the relay device shown in FIG. 5, and is configured to receive third grant information sent by the network side node. The third grant information includes a resource that is allocated by the network side node to the relay device and that is used to send an extended buffer status report. In a possible implementation, the grant information receiving unit is further configured to receive fourth grant information and fifth grant information that are sent by the network side node. For functions of the fourth grant information and the fifth grant information, refer to the detailed descriptions of the fourth grant information and the fifth grant information in Embodiment 3. Details are not described herein again.

The wireless communications module 807 further includes an air interface that is not marked in FIG. 8. The air interface is used by the relay device to communicate with another user equipment or a base station. The air interface includes a PC5 interface and a Uu interface. The PC5 interface is an interface between the relay device and another device, that is, an interface between the relay device and the target device. The Uu interface is an interface between the relay device and a base station, that is, an interface between the relay device and the network side node.

Figure 9:
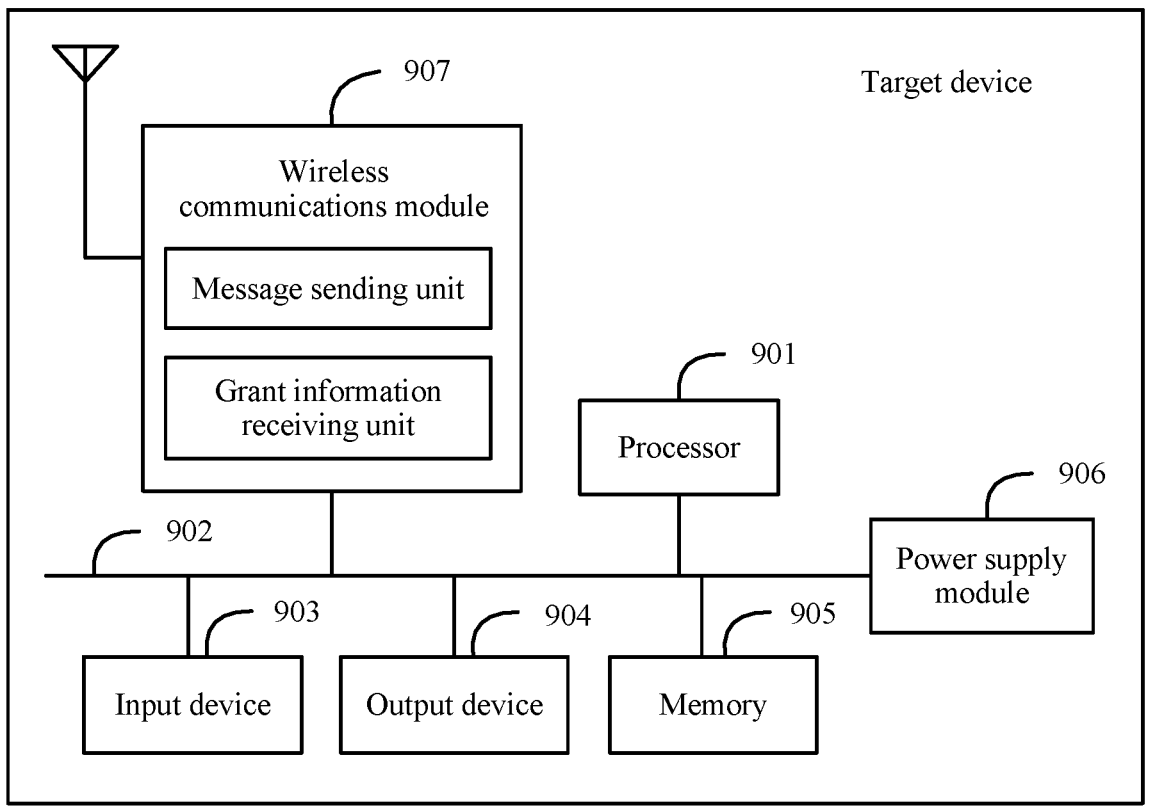
FIG. 9 is a schematic structural diagram of another target device according to an embodiment of the present disclosure.

Referring to FIG. 9, FIG. 9 is a schematic structural diagram of another target device according to an embodiment of the present disclosure. As shown in FIG. 9, the target device includes at least one processor 901 such as a CPU, at least one communications bus 902, an input device 903, an output device 904, a memory 905, a power supply module 906, and a wireless communications module 907. The target device is user equipment that requests the relay device shown in FIG. 8 to request a network side node to allocate a transmission resource to the target device. The target device is relatively close to the relay device shown in FIG. 8. The communications bus 902 is configured to implement connections and communication between these components. The input device 903 is configured to receive an audio signal or a video signal, and is further configured to: receive an input command of a user, and generate key input data according to the input command, to control various operations of the relay device. The output device 904 is configured to provide an output signal (for example, an audio signal, a video signal, an alert signal, or a vibrating signal) in a visual manner, an audio manner, and/or a tactile manner. The output device 904 may include a display unit, an audio output module, an alert unit, and the like that are not marked in FIG. 9. The power supply module 906 receives external power or internal power under control of the processor 901, and supplies power to the devices, the modules, the memory 905, the processor 901, and the like on the communications bus 902. A power capacity of the power supply module 906 of the target device is smaller than a power capacity of the power supply module 806 of the relay device, and the target device is user equipment having a limited quantity of electricity.

The memory 905 may include at least one type of storage medium. The storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic storage, a magnetic disk, an optical disc, and the like. The processor 901 usually controls overall operations of the relay device. For example, the processor 901 performs control and processing that are related to a voice call, data communication, a video call, or the like.

The wireless communications module 907 is an apparatus configured to send a radio signal to at least one of a base station (for example, an access point or a NodeB), an external terminal, or a server, and/or receives a radio signal from at least one of the base station, the external terminal, or the server. The radio signal may include a voice call signal, a video call signal, or various types of data that is sent and/or received according to a text message and/or a multimedia message.

The wireless communications module 907 includes a message sending unit and a grant information receiving unit. The message sending unit is corresponding to the message sending unit 21 in the target device shown in FIG. 6, and is configured to send a first target device message to a relay device. The first target device message is used to trigger the relay device to request a network side node to allocate a data transmission resource to the target device. In a possible implementation, the message sending unit is further configured to send a second target device message to the relay device. The second target device message is used to trigger the relay device to request the network side node to allocate, to the target device, a resource used by the target device to send the first target device message. For a specific implementation process of the message sending unit, refer to the detailed descriptions of the message sending unit 21 in the target device shown in FIG. 6. Details are not described herein again. The grant information receiving unit is corresponding to the grant information receiving unit 22 in the target device shown in FIG. 6, and is configured to receive first grant information sent by the network side node. In a possible implementation, the grant information receiving unit is further configured to receive second grant information sent by the network side node. For a specific implementation process of the grant information receiving unit, refer to the detailed descriptions of the grant information receiving unit 21 in the target device shown in FIG. 6. Details are not described herein again.

The wireless communications module 907 further includes an air interface that is not marked in FIG. 9. The air interface is used by the relay device to communicate with another user equipment or a base station. The air interface includes a PC5 interface and a Uu interface. The PC5 interface is an interface between the target device and another device, that is, an interface between the target device and the relay device. The Uu interface is an interface between the target device and a base station, that is, an interface between the target device and the network side node.

Figure 10:
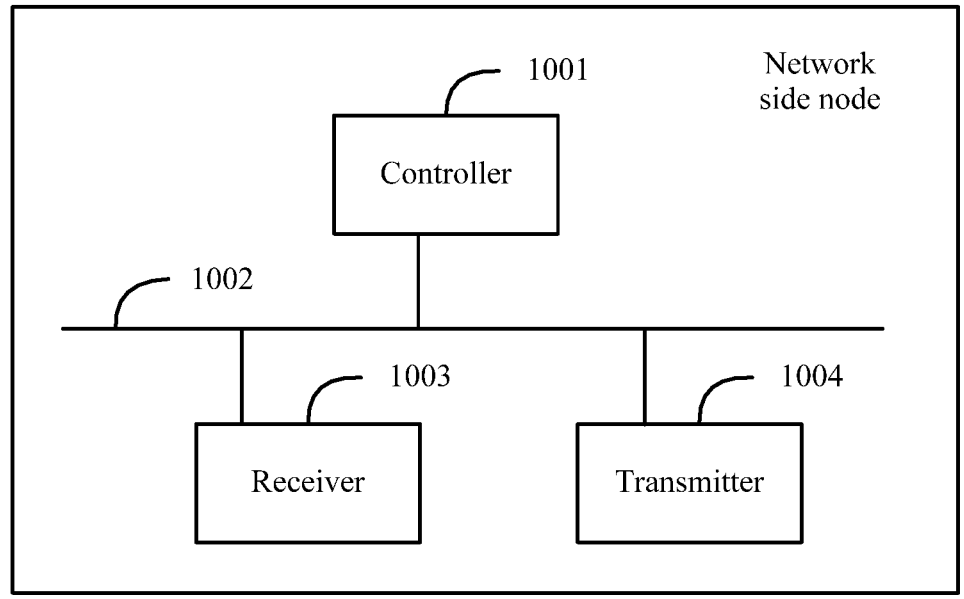
FIG. 10 is a schematic structural diagram of another network side node according to an embodiment of the present disclosure.

Referring to FIG. 10, FIG. 10 is a schematic structural diagram of another network side node according to an embodiment of the present disclosure. As shown in FIG. 10, the network side node includes at least one controller 1001, at least one communications bus 1002, a receiver 1003, and a transmitter 1004. The network side node allocates various resources in communication to the relay device shown in FIG. 8 and the target device shown in FIG. 9. The communications bus 1002 is configured to implement connections and communication between these components. The receiver 1003 and the transmitter 1004 are collectively referred to as a transceiver station. Under control of the controller 1001, the transceiver station completes conversion between a base station and a wireless channel, and implements over-the-air wireless transmission of a communication signal between user equipment and a mobile platform, and a related control function. The controller 1001 is responsible for managing all mobile communications interfaces, and is mainly responsible for wireless channel allocation, release, and management.

The receiver 1003 includes a message receiving unit that is not marked in FIG. 10. The message receiving unit is corresponding to the message receiving unit 31 in the network side node shown in FIG. 7, and is configured to receive a first relay device message sent by a relay device. In a possible implementation, the message receiving unit is further configured to receive a second relay device message and a third relay device message that are sent by the relay device, and even receive a fourth relay device message and a fifth relay device message that are sent by the relay device. For functions of the first relay device message, the second relay device message, the third relay device message, the fourth relay device message, and the fifth relay device message, refer to the detailed descriptions of the first relay device message, the second relay device message, the third relay device message, the fourth relay device message, and the fifth relay device message in Embodiment 1 to Embodiment 3. Details are not described herein again.

The transmitter 1004 includes a grant information sending unit that is not marked in FIG. 10. The grant information sending unit is corresponding to the grant information sending unit 32 in the network side node shown in FIG. 7, and is configured to send, to a target device or the relay device according to a relay device message sent by the relay device, grant information carrying a resource. Specifically, the grant information sending unit sends, to the target device according to the first relay device message, first grant information carrying a data transmission resource; sends, to the target device according to the second relay device message, second grant information carrying a resource that is used by the target device to send a second target device message to the relay device; sends, to the relay device according to the third relay device message, third grand information carrying a resource that is used by the relay device to send the first relay device message; further sends, according to the first relay device message, fourth grant information carrying a data forwarding resource; and so on.

The network side node further includes an air interface that is not marked in FIG. 10. The air interface includes a Uu interface between the target device and the network side node, and a Uu interface between the relay device and the network side node.

It should be noted that, the relay device shown in FIG. 8, the target device shown in FIG. 9, and the network side node shown in FIG. 10 are configured to implement the content in Embodiment 1 to Embodiment 3.

An embodiment of the present disclosure further provides a resource request system, including the relay device shown in FIG. 5 or FIG. 8, the target device shown in FIG. 6 or FIG. 9, and the network side node shown in FIG. 7 or FIG. 10. A message receiving unit in the relay device is configured to receive a target device message sent by a message sending unit in the target device, where the target device message includes a first target device message and/or a second target device message. A message receiving unit in the network side node is configured to receive a relay device message sent by a message sending unit in the relay device, where the relay device message includes at least one of a first relay device message, a second relay device message, a third relay device message, a fourth relay device message, or a fifth relay device message. A grant information sending unit in the network side node is configured to send grant information to a grant information receiving unit in the target device, where the grant information includes first grant information and/or second grant information. The grant information sending unit in the network side node is further configured to send grant information to a grant information receiving unit in the relay device, where the grant information includes third grant information and/or fourth grant information, or includes the third grant information, the fourth grant information, and fifth grant information. In the resource request system, the target device sends the first target device message to the relay device. When receiving the first target device message, the relay device sends the first relay device message to the network side node according to the first target device message. The network side node receives the first relay device message, and sends the first grant information to the target device according to the first relay device message. The first grant information includes a data transmission resource allocated by the network side node to the target device. Therefore, the relay device requests, in place of the target device, the data transmission resource from the network side node, so as to reduce energy consumption of the target device while the target device obtains the transmission resource.

It should be noted that, for brief description, the foregoing method embodiments are represented as a series of actions. However, a person skilled in the art should appreciate that the present disclosure is not limited to the described order of the actions, because according to the present disclosure, some steps may be performed in other sequences or simultaneously. In addition, a person skilled in the art should also appreciate that all the embodiments described in this specification are example embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

A sequence of the steps of the method in the embodiments of the present disclosure may be adjusted, and certain steps may also be combined or removed according to an actual requirement.

Units in the apparatus in the embodiments of the present disclosure may be combined, divided, and deleted according to an actual requirement. A person skilled in the art may integrate or combine different embodiments or characteristics of different embodiments described in this specification.

With descriptions of the foregoing embodiments, a person skilled in the art may clearly understand that the present disclosure may be implemented by hardware, firmware or a combination thereof. When the present disclosure is implemented by software, the foregoing functions may be stored in a computer readable medium or transmitted as one or more instructions or code in the computer readable medium. The computer-readable medium includes a computer storage medium and a communications medium. The communications medium includes any medium that enables a computer program to be transmitted from one place to another place. The storage medium may be any available medium accessible to a computer. The following is taken as an example but is not limited: The computer readable medium may include a random access memory (RAM), a read-only memory (ROM), an electrically erasable programmable read-only memory (EEPROM), a compact disc read-only memory (CD-ROM) or another optical disc storage, a magnetic disk storage medium or another magnetic storage device, or any other medium that can be used to carry or store expected program code in a command or data structure form and that is accessible to a computer. In addition, any connection may be appropriately defined as a computer readable medium. For example, if software is transmitted from a website, a server, or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk, and a Blu-ray disc. The disk usually copies data by a magnetic means, and the disc optically copies data by a laser means. The foregoing combination should also be included in the protection scope of the computer readable medium.

In summary, what is described above is merely example embodiments of the technical solutions of the present disclosure, but is not intended to limit the protection scope of the present disclosure. Any modification, equivalent replacement, or improvement made without departing from the principle of the present disclosure shall fall within the protection scope of the present disclosure.

What is claimed is:

1. A resource request method, comprising:
   receiving, by a relay device, a first target device message sent by a target device, wherein the first target device message is used to trigger the relay device to request a network side node to allocate a data transmission resource to the target device;
   sending, by the relay device, a first relay device message to the network side node according to the first target device message, wherein the first relay device message is used to trigger the network side node to send first grant information to the target device, and the first grant information comprises the data transmission resource allocated by the network side node to the target device, wherein the data transmission resource is used by the target device to transmit to-be-transmitted data;
   wherein, before the receiving, by the relay device, the first target device message sent by the target device: receiving, by the relay device, a second target device message sent by the target device, the second target device message being used to trigger the relay device to request the network side node to configure a D2D sidelink buffer status report resource for the target device; and sending, by the relay device, a second relay device message to the network side node according to the second target device message, the second relay device message being used to trigger the network side node to send second grant information to the target device, the second grant information comprising the D2D sidelink buffer status report resource configured by the network side node for the target device, wherein, the D2D sidelink buffer status report resource is used by the target device to send the first target device message to the relay device.

2. The method according to claim 1, before the sending, by the relay device, a first relay device message to the network side node according to the first target device message, further comprising:
   sending, by the relay device, a third relay device message to the network side node, wherein the third relay device message is used to request the network side node to configure an extended-buffer-status-report resource for the relay device; and
   receiving, by the relay device, third grant information sent by the network side node, wherein the third grant information comprises the extended-buffer-status-report resource configured by the network side node for the relay device.

3. The method according to claim 2, wherein the sending, by the relay device, a first relay device message to the network side node according to the first target device message comprises:

sending, by the relay device, the first relay device message to the network side node according to the first target device message by using the extended-buffer-status-report resource.

4. The method according to claim 1, wherein the first relay device message is further used to trigger the network side node to send fourth grant information to the relay device; and after the sending, by the relay device, a first relay device message to the network side node according to the first target device message, the method further comprises:

receiving, by the relay device, the fourth grant information sent by the network side node, wherein the fourth grant information comprises a data forwarding resource allocated by the network side node to the relay device, and the data forwarding resource is used by the relay device to forward the to-be-transmitted data.

5. A resource request method, comprising:

sending, by a target device, a first target device message to a relay device, wherein the first target device message is used to trigger the relay device to request a network side node to allocate a data transmission resource to the target device;

receiving, by the target device, first grant information sent by the network side node, wherein the first grant information comprises the data transmission resource allocated by the network side node to the target device, wherein, the data transmission resource is used by the target device to transmit to-be-transmitted data; and before sending, by the target device, the first target device message to the relay device: sending, by the target device, a second target device message to the relay device, wherein the second target device message is used to trigger the relay device to request the network side node to configure a D2D sidelink buffer status report resource for the target device; and receiving, by the target device, second grant information sent by the network side node, wherein the second grant information comprises the D2D sidelink buffer status report resource configured by the network side node for the target device.

6. The method according to claim 5, wherein the sending, by a target device, a first target device message to a relay device comprises:

sending, by the target device, the first target device message to the relay device by using the D2D sidelink buffer status report resource.

7. A relay device, comprising: a receiver and a transmitter; wherein the receiver is configured to receive a first target device message sent by a target device, wherein the first target device message is used to trigger the relay device to request a network side node to allocate a data transmission resource to the target device; and the transmitter is configured to send a first relay device message to the network side node according to the first target device message, wherein the first relay device message is used to trigger the network side node to send first grant information to the target device, and the first grant information comprises the data transmission resource allocated by the network side node to the target device, wherein, the data transmission resource is used by the target device to transmit to-be-transmitted data;

wherein, the receiver is further configured to receive a second target device message sent by the target device, the second target device message being used to trigger the relay device to request the network side node to configure a D2D sidelink buffer status report resource for the target device, and, the transmitter is further configured to send a second relay device message to the network side node according to the second target device message, the second relay device message being used to trigger the network side node to send second grant information to the target device, the second grant information comprising the D2D sidelink buffer status report resource configured by the network side node for the target device, wherein the D2D sidelink buffer status report resource is used by the target device to send the first target device message to the relay device.

8. The relay device according to claim 7, wherein the transmitter is further configured to send a third relay device message to the network side node, wherein the third relay device message is used to request the network side node to configure an extended-buffer-status-report resource for the relay device; and wherein the receiver is further configured to receive third grant information sent by the network side node, wherein the third grant information comprises the extended-buffer-status-report resource configured by the network side node for the relay device.

9. The relay device according to claim 8, wherein the transmitter is configured to send the first relay device message to the network side node according to the first target device message by using the extended-buffer-status-report resource.

10. The relay device according to claim 7, wherein the first relay device message is further used to trigger the network side node to send fourth grant information to the relay device; and the receiver is further configured to receive the fourth grant information sent by the network side node, wherein the fourth grant information comprises a data forwarding resource allocated by the network side node to the relay device, and the data forwarding resource is used by the relay device to forward the to-be-transmitted data.

11. A target device, comprising: a transmitter and a receiver; wherein the transmitter is configured to send a first target device message to a relay device, wherein the first target device message is used to trigger the relay device to request a network side node to allocate a data transmission resource to the target device; and the receiver is configured to receive first grant information sent by the network side node, wherein the first grant information comprises the data transmission resource allocated by the network side node to the target device, wherein the data transmission resource is used by the target device to transmit to-be-transmitted data;

wherein the transmitter is further configured to send a second target device message to the relay device, the second target device message being used to trigger the relay device to request the network side node to configure a D2D sidelink buffer status report resource for the target device, and the receiver is further configured to receive second grant information sent by the network side node, wherein the second grant information comprises the D2D sidelink buffer status report resource configured by the network side node for the target device.

12. The target device according to claim 11, wherein the transmitter is configured to send the first target device message to the relay device by using the D2D sidelink buffer status report resource.

\* \* \* \* \*